United States Patent
Fenile

(10) Patent No.: US 12,473,156 B2
(45) Date of Patent: Nov. 18, 2025

(54) CONVEYOR SYSTEM HAVING A DEVICE FOR STEERING HORIZONTALLY CONVEYED MATERIALS

(71) Applicant: Ferag AG, Hinwill (CH)

(72) Inventor: Roberto Fenile, Wetzikon (CH)

(73) Assignee: FERAG AG, Hinwil (CH)

( * ) Notice: Subject to any disclaimer, the term of this patent is extended or adjusted under 35 U.S.C. 154(b) by 268 days.

(21) Appl. No.: 18/341,976

(22) Filed: Jun. 27, 2023

(65) Prior Publication Data

US 2024/0002171 A1    Jan. 4, 2024

(30) Foreign Application Priority Data

Jun. 29, 2022   (CH) .................................. 788/2022

(51) Int. Cl.
| | |
|---|---|
| *B65H 5/22* | (2006.01) |
| *B65G 39/07* | (2006.01) |
| *B65G 39/18* | (2006.01) |
| *B65G 47/68* | (2006.01) |

(52) U.S. Cl.
CPC ............. *B65G 47/68* (2013.01); *B65G 39/07* (2013.01); *B65G 39/18* (2013.01); *B65G 2811/0657* (2013.01)

(58) Field of Classification Search
CPC ........ B65G 39/07; B65G 39/18; B65G 47/68; B65G 2811/0657; B65H 5/22; B65H 5/226
USPC .................................. 198/781.03, 782, 689.1
See application file for complete search history.

(56) References Cited

U.S. PATENT DOCUMENTS

| | | | |
|---|---|---|---|
| 3,254,752 A | 6/1966 | Bauch et al. | |
| 3,701,412 A | 10/1972 | Wriedt | |
| 4,261,559 A | 4/1981 | Mitzel | |
| 5,186,451 A * | 2/1993 | Hirao ..................... | B65H 5/226 399/361 |
| 6,254,081 B1 * | 7/2001 | Rasmussen ............. | B41J 13/226 271/96 |
| 7,650,979 B2 * | 1/2010 | Szarkowski ............ | B65G 13/08 193/35 MD |
| 7,753,242 B2 * | 7/2010 | Raueiser ................ | B65H 5/226 493/917 |
| 8,839,445 B2 * | 9/2014 | Tarrago ............... | H04L 63/0209 710/33 |

(Continued)

FOREIGN PATENT DOCUMENTS

| | | |
|---|---|---|
| CN | 211282632 U | 8/2020 |
| CN | 212739717 U | 3/2021 |

(Continued)

OTHER PUBLICATIONS

US 2002/005613 A1, Meyer, Jan. 17, 2002.*

(Continued)

*Primary Examiner* — Douglas A Hess
(74) *Attorney, Agent, or Firm* — Rankin, Hill & Clark LLP

(57) ABSTRACT

A drivable roller having a cylindrical surface for use in a conveyor system for steering conveyed materials conveyed horizontally across the roller, and an arrangement including such a roller. The roller can be connected to a vacuum device and has at least one vacuum opening for generating a vacuum in the region of the cylindrical surface and which opens into the cylindrical surface of the roller.

21 Claims, 14 Drawing Sheets

(56) References Cited

U.S. PATENT DOCUMENTS

| | | | |
|---|---|---|---|
| 9,022,210 B2 * | 5/2015 | Tully | B29C 48/11 |
| | | | 198/789 |
| 10,106,349 B2 * | 10/2018 | Mueller | B65H 5/04 |
| 10,167,154 B2 * | 1/2019 | Barberan Latorre | |
| | | | B65H 11/005 |
| 11,117,764 B2 * | 9/2021 | Herrmann | F26B 3/28 |
| 12,168,541 B2 * | 12/2024 | Groholski | B65H 19/1852 |
| 2021/0269252 A1 | 9/2021 | Huang et al. | |

FOREIGN PATENT DOCUMENTS

| | | | |
|---|---|---|---|
| CN | 113682720 A | | 11/2021 |
| DE | 1219268 B | | 6/1966 |
| DE | 28 56 777 B1 | | 3/1980 |
| DE | 3910524 C2 | | 4/1993 |
| DE | 102 35 661 A1 | | 2/2004 |
| FR | 2 407 150 A1 | | 5/1979 |
| JP | 10-76206 A | | 3/1998 |
| KR | 10-2022-004397 A | | 4/2022 |
| KR | 10-2021-0146681 A | | 12/2022 |
| WO | 2015/200460 A1 | | 12/2015 |

OTHER PUBLICATIONS

US 2004/0250706 A1, De Matteis, Dec. 16, 2004.*
European Search Report dated Oct. 24, 2023, Application No. 23 181 955.8; 40 pages.
Switzerland Search Report dated Nov. 11, 2022, Application No. CH00788/22; 2 pages.

\* cited by examiner

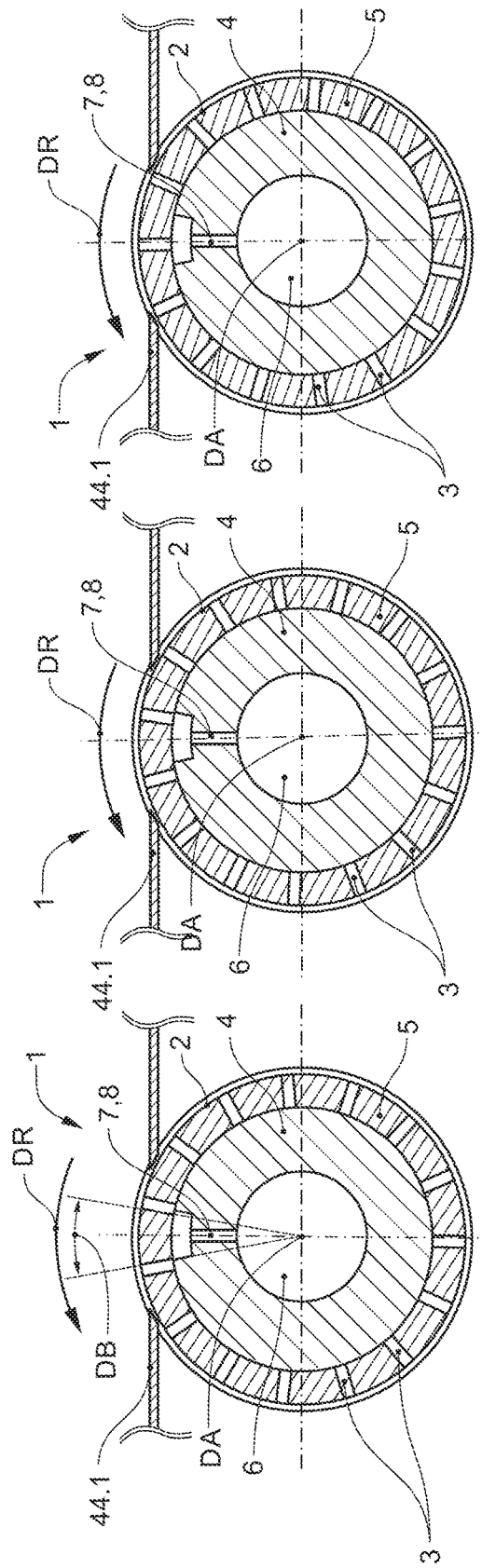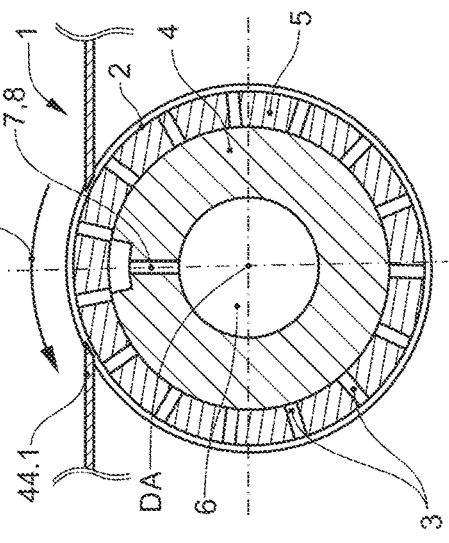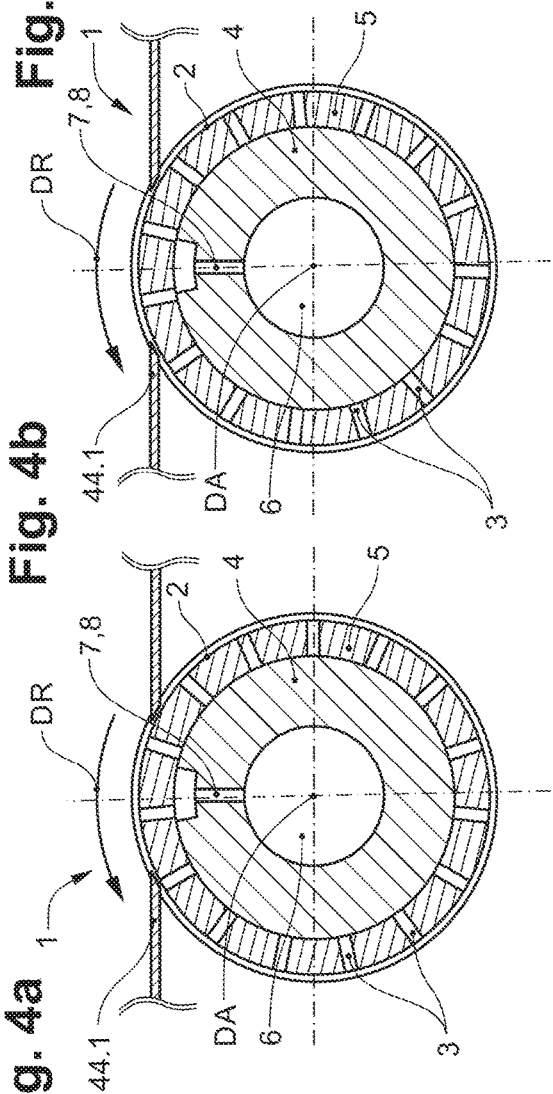

CONVEYOR SYSTEM HAVING A DEVICE FOR STEERING HORIZONTALLY CONVEYED MATERIALS

BACKGROUND OF THE INVENTION

The invention is in the field of conveyor technology, particularly internal logistics, and relates to a drivable roller for use in a conveyor system for steering horizontally conveyed materials, i.e. for steering conveyed materials conveyed in a lying manner.

The invention further relates to an arrangement having at least one drivable roller for use in a conveyor system for steering conveyed materials conveyed horizontally across the arrangement, and to a conveyor system having a conveyor device for horizontally conveying conveyed goods and having such an arrangement for steering the horizontally conveyed materials.

The term "horizontally conveyed" has not to be interpreted literally in the sense that the conveyed material is only conveyed along a horizontal conveyor track. The conveyed materials can also be conveyed along an inclined conveyer track. However, a conveying of the conveyed material along a horizontal conveyor track is in the foreground.

The invention further relates to a method for steering conveyed materials by means of such an arrangement.

Drivable rollers for use in a conveyor system for steering horizontally conveyed materials and corresponding conveyor systems including such rollers are known from the prior art.

The conveyed materials are conveyed across the arrangement having the driven rollers for steering the materials. Due to the contact pressure exerted by the conveyed materials on the driven rollers, an entraining force is transmitted from the rollers to the conveyed materials. The direction of motion of the conveyed materials supported, i.e. lying on the rollers can be influenced and modified by pivoting the rollers.

For example, DE 39 10 524 C2 describes a roller gate between segments of conveyor tracks for sorting conveyed materials, such as packages. The roller gate is made of a series of a plurality of driven rollers extending across the entire width of the conveyor track and disposed transverse to the conveying direction. The rollers protruding beyond the conveyor track are individually rotatably supported in side walls. By pivoting the driven rollers, the conveyed materials are diverted from the conveying direction thereof. The roller gate is used at a discharge point for discharging conveyed materials.

U.S. Pat. No. 3,254,752 also describes a roller gate disposed at a branching conveying device for specifically steering the conveyed materials onto one of the two subsequent downstream conveyor tracks of the branching conveyor device.

WO 2015/200460 A1 describes a plate-shaped roller assembly having a roller pivotable by means of a gearbox about an axis disposed perpendicular to the plane of travel. The associated conveyor gate includes a plurality of roller assemblies disposed in rows and columns and inset in a conveyor surface.

SUMMARY OF THE INVENTION

The principle underlying roller-based conveyor gates is that the conveyed materials are conveyed across the rollers and the weight thereof is supported thereon. The driven rollers thus exert an entraining force on the conveyed materials, such that the conveyed materials are transported parallel to the pivoted position of the rollers or in the tangential direction of rotation of the rollers. The tangential direction of rotation corresponds to the tangential direction of the rotation at the crest of the roller protruding into the conveyor space.

Depending on the pivoted position of the rollers, the conveyed materials are then steered to one of the subsequent downstream conveyer tracks.

When the conveyed materials are comparatively lightweight piece goods, the contact pressure and corresponding frictional grip can be too low for the driven roller to exert sufficient entraining force on the conveyed material. The relevant conveyed material continues to be displaced in the previous conveying direction due to the inertia thereof.

The present problem is generally additionally exacerbated by an increase in conveying power and corresponding conveying speed, so that as a result higher inertial forces and even aerodynamic effects occur and counteract the frictional grip.

Flexible, pliable conveyed materials, such as articles of clothing or conveyed materials in flexible packaging, such as film-wrapped conveyed materials, can also from time to time have poor frictional grip with the driven rollers, so that the rollers are not able to or not sufficiently able to steer the conveyed materials in the desired direction.

This is partially due to the fact that such conveyed materials are not supported exclusively on the rollers protruding from the support surface, as is the case with rigid conveyed materials, but also on the support surface between the rollers. The entire weight of the conveyed materials accordingly does not bear on the rollers.

In particular, the combination of lightweight conveyed materials having flexible, pliable properties or having a flexible packaging wrapper are not particularly well suited for processing by means of roller gates or switches such as are known from the prior art.

Due to the increasing shipping trade for articles of clothing, for example, packaged and dispatched in plastic wrappers, the need is great for trouble-free conveying and steering of lightweight, pliable conveyed materials and conveyed materials packaged in flexible film by means of roller gates.

One object of the present invention is therefore to propose a drivable and particularly pivotable roller by means of which lightweight, pliable conveyed materials and conveyed materials packaged in flexible films can be conveyed horizontally and steered in a conveyor plane without trouble.

The drivable roller should also require little adaptation of the fundamental principle of roller-based steering devices for conveyor systems for horizontally conveying conveyed materials.

A further object of the invention is to propose a roller-based steering device for conveyor systems for horizontally conveying conveyed materials and able to be operated by means of already existing devices of the conveyor system.

The drivable roller is implemented for use in a conveyor system for steering horizontally conveyed materials.

Steering means, among other things, exerting a change in direction on the conveyed material during conveying. The change in direction is particularly parallel to a conveyor surface or conveyor plane. The steering can be, for example, diverting, deflecting, positioning, or repositioning on the conveyor structure, in particular conveyor element. The term "steering" can also include positioning the conveyed material parallel to the main conveying direction by means of the arrangement according to the invention.

The roller, which forms a cylindrical surface, can be connected according to the invention to a vacuum device and includes at least one vacuum opening for generating a vacuum in the region of the cylindrical surface and which opens into the cylindrical surface of the roller. That is, at least one vacuum opening is disposed in the region of the cylindrical surface. The term vacuum opening includes both the opening hole in the cylindrical surface and the associated passage leading to the axle from the opening hole in the cylindrical surface.

The roller includes a connection interface for connecting to a vacuum source or a vacuum generator. A flexible hose is particularly connected to the connection interface and is able to compensate for a pivoting motion of the roller.

The drivable roller having the at least one vacuum opening is implemented for exerting a retaining force on a conveyed material supported, i.e. lying on the driven roller. The retaining force on the conveyed material supported on the roller is thereby exerted by a vacuum generated in the region of the vacuum opening.

The roller may have a maximum outer diameter of 50 to 90 mm, for example.

The conveyed material is particularly a piece good or an individual article. Horizontally conveyed materials are also referred to as flat goods.

The conveyed material may be a rigid piece good, such as a package. The conveyed material may be a flexible piece good, such as an article of clothing. The conveyed material may be a conveyed material packaged in a flexible packaging wrapper. The flexible packaging wrapper may be made of plastic, reinforced paper, or a laminate, for example. The conveyed material can be a conveyed material wrapped in film. The conveyed material may particularly be an article of clothing packaged in a plastic wrapper or film. The conveyed material may be a printed product, for example wrapped in film. The conveyed material may be a letter.

Furthermore, conveyor trays or conveyor containers supported loosely on the conveyor structure and having goods transported therein fall under the term "conveyed materials".

Due to the vacuum generated, an induced draft is particularly generated at the at least one vacuum opening in the region of the cylindrical surface and acts on the conveyed material supported on the roller, or on the outer wrapper thereof. The vacuum openings can accordingly also be considered as suction openings.

The vacuum or induced draft is particularly effective for flexible conveyed materials or for conveyed materials having a flexible packaging wrapper nestling against the cylindrical surface of the roller due to the pliability thereof and thus fully covering the at least one vacuum opening. The flexible surface or packaging wrapper of the conveyed material is drawn to the vacuum opening by the induced draft, whereby the opening is closed off. This leads in turn to improved adhesion of the conveyed material to the roller.

The term "roller" particularly also includes wheels, such as disc wheels, cylinders, spherical rotating bodies, or rotating bodies having a spherical surface.

According to a refinement of the invention, the roller includes a (physical) axle having an inner cavity and an annular roller body rotatably supported about the axle and implementing the cylindrical surface. The roller body is accordingly rotatably supported about a geometric axis of rotation running parallel to the axle.

The connection interface to the vacuum generator is particularly disposed at one axial end of the axle.

The roller body is particularly rotatably supported on the axle by means of corresponding bearings, such as ball bearings. The roller body can also be rotatably supported on the axle by means of a bushing implemented as a plain bearing.

A gap seal can be implemented between the roller body and the axle.

A plurality of rollers, for example two, disposed adjacent to each other particularly parallel to the axis of rotation can have a common axis. The roller bodies of the individual rollers are accordingly disposed spaced apart from each other along the axis. The vacuum at the vacuum openings of the rollers is correspondingly applied by means of the common inner cavity. The rollers accordingly include a common connection interface to the vacuum generator.

The axle includes at least one pass-through opening leading from the inner cavity outward to the annular roller body. The pass-through opening particularly leads radially outward. The pass-through opening is connected to the inner cavity of the axle. The pass-through opening is particularly stationary.

The at least one pass-through opening, together with the at least one vacuum opening, particularly forms a continuous passage relative to the axle in a defined range of rotary orientation of the roller body.

The range of rotary orientation is equivalent to a circular arc facing the conveyor space and overlapping the at least one vacuum opening when the roller is rotated and in which a continuous passage is formed. The range of rotary orientation therefore corresponds to a rotary angle range extending across a circular sector having the above-mentioned circular arc.

A vacuum applied in the inner cavity acts via the continuous passage out to the vacuum opening in the cylindrical surface of the roller body.

The pass-through opening is particularly oriented radially outward toward the conveyor space of the conveyed materials. The at least one vacuum opening is particularly oriented radially outward toward the cylindrical surface.

The conveyor space is understood to be such a three-dimensional space through which the conveyed materials are conveyed, or such space as is occupied by the conveyed units during conveying thereof. The conveyor space is bounded at the bottom thereof by a conveyor structure or support structure.

A plurality of pass-through openings can be disposed in a row and spaced apart from each other along the axle. The openings are particularly identically oriented. In place of a plurality of pass-through openings, one slit extending along the axle can also be provided. The pass-through openings or the slit, together with vacuum openings disposed adjacent to each other along the axis of rotation, form continuous passages in a defined range of rotary orientation.

The annular roller body particularly includes a plurality of vacuum openings disposed on the cylindrical surface one after the other or one behind the other and spaced apart from each other along the direction of rotation of the roller body. The vacuum openings are particularly disposed in one plane running perpendicular to the axis of rotation. The vacuum openings are particularly oriented radially outward toward the cylindrical surface, starting from the axle.

The vacuum openings are particularly disposed spaced apart from each other in the direction of rotation such that the pass-through opening always forms a continuous passage with at least one vacuum opening regardless of the angular position of the roller body.

It is thereby ensured that a vacuum is continuously maintained at the cylindrical surface of the roller toward the conveyor space despite the rotating roller body.

The annular roller body further particularly includes a plurality of vacuum openings disposed adjacent to each other and spaced apart from each other parallel to the axis of rotation of the roller body. It is thereby ensured that a vacuum can be generated at the cylindrical surface across the entire effective conveying width of the roller. The effective conveying width of the roller corresponds to that width of the roller at which the conveyed materials are supported on the roller and can make conveying contact with the roller.

By rotating the roller body, the at least one vacuum opening is displaced past the at least one pass-through opening as soon as the vacuum opening is oriented into the conveying space, and together with the pass-through opening forms a continuous passage. The continuous passage is particularly radially oriented.

If the roller body includes a plurality of vacuum openings disposed one after another in the direction of rotation, then no later than when a vacuum opening is displaced past the pass-through opening and thus the continuous passage has been eliminated, the successive vacuum opening is displaced past the pass-through opening and forms a (new) continuous passage. In this manner, the pass-through opening always forms a continuous passage together with at least one vacuum opening.

Fundamentally, two vacuum openings or more than two vacuum openings can simultaneously form a continuous passage together with the at least one pass-through opening. This is particularly relevant to the transition phase when a preceding vacuum opening is about to depart the region of influence of the pass-through opening and a successive vacuum opening is displaced into the region of influence of the pass-through opening.

According to a refinement of the invention, the pass-through opening has a greater extent or width than the vacuum opening at the outer surface of the axle as seen along the direction of rotation of the roller body or in a plane transverse to the axis of rotation.

The extent of the pass-through opening at the outer surface of the axle defines the range of rotary orientation in which the pass-through opening forms a continuous passage together with the vacuum opening.

According to a refinement of the invention, the roller or the roller body is enlaced at least partially by at least one flexible force transfer element for producing a force-transmitting frictional contact to a conveyed material supported on the roller.

The at least one force transfer element is particularly guided in a groove running circumferentially in the direction of rotation at the outer circumference of the roller or roller body. The cylindrical surface of the roller or roller body is therefore structured.

The at least one flexible force transfer element is particularly characterized by a high frictional grip, facilitating the entraining of a conveyed material supported on the roller and the transferring of an entraining force to the conveyed material.

The at least one flexible force transfer element is particularly made of plastic. The force transfer element may be made of an elastomer, rubber, natural rubber, or polyurethane, for example. The force transfer element may also be multilayer in design and may particularly include one of the materials listed above.

The partial enlacement of the roller is present particularly in such a surface segment of the roller or roller body protruding past a support surface into the conveyor space.

The force transfer element may, however, also completely enlace the roller as a flexible annular body.

According to a refinement of the invention, one force transfer element is disposed on both sides of the at least one vacuum opening and particularly on both sides of each of a plurality of vacuum openings disposed one after another in the direction of rotation in a common plane along the cylindrical surface.

Due to the flexible force transfer element, the roller is capable of exerting a sufficient entraining force on a rigid conveyed material as well, such as a package, such as is not possible by means of vacuum, for example. This is due to the lack of nestling of the rigid conveyed material against the cylindrical surface of the roller or roller body.

The roller is thus capable of exerting an entraining force on a conveyed material supported on the roller both by means of the flexible force transfer element and by means of the vacuum generated at the at least one vacuum opening. Depending on the properties of the conveyed material, such as flexible or rigid, the entraining force is applied mostly by means of the friction acting at the flexible force transfer element or by means of the vacuum acting at the vacuum opening.

The invention further relates to an arrangement for use in a conveyor system for steering conveyed materials conveyed horizontally across the arrangement, having at least one drivable roller as described above and having a drive for driving the at least one roller about the axis of rotation thereof. The axis of the roller is particularly immovably supported relative to the geometric axis of rotation in the arrangement.

Steering of the horizontally conveyed materials by the arrangement is connected to a change in the position of the conveyed materials in the conveyor space. The arrangement may accordingly also be referred to as a position changing arrangement.

The arrangement particularly includes a pivot device for pivoting the at least one drivable roller about a pivot axis disposed perpendicular to the axis of rotation of the at least one roller. The pivot axis is particularly disposed perpendicular to a support surface or conveyor surface or conveyor plane.

The arrangement particularly includes a flat support structure implementing a particularly flat support surface for the conveyed materials. The support structure particularly includes at least one recess or opening in which the at least one drivable roller is inset such that a segment of the cylindrical surface of the roller protrudes past the support surface of the support structure in the direction of the conveyor space. The pivot axis is thereby particularly disposed perpendicular to the support surface. The support structure is particularly stationary, that is, immovable. The support structure is particularly rigid. The support structure may be implemented as a support table. The support structure may be made of one or more plate elements, particularly of metal plates.

The flat support structure is particularly flush with the conveyor structure of an adjacent conveyor device.

According to a particular embodiment of the invention, the pivot axis of the at least one roller does not intersect with the axis of rotation of the at least one roller.

The at least one roller is corresponding steerable by means of the pivot device. The roller may therefore also be referred to as a steering roller.

The at least one roller may be driven by means of a drive belt at least partially enlacing the roller. The drive belt is driven, for example, by a drive roller, drive axle, or drive cylinder.

A plurality of rollers, particularly disposed adjacent to each other, may each be driven by means of at least one drive belt by means of a common drive roller, drive axle, or drive cylinder.

The roller may also be driven directly by means of a drive roller. A plurality of rollers, particularly disposed adjacent to each other, may be driven directly by means of a common drive roller, drive axle, or drive cylinder. A plurality of rollers may each also be driven directly by means of a separate drive roller, drive axle, or drive cylinder. The drive rollers, drive axles, or drive cylinders may, however, be coupled by technical drive means, for example by means of a belt, a chain, or gears.

The belt drive has the advantage that the at least one roller can be pivoted about the pivot axis without the drive roller, drive axle, or drive cylinder also needing to be pivoted. Rather, the pivoting of the at least one roller leads to a twisting of the drive belt. This is not disadvantageous for the drive, however, when the distance between the roller (steering roller) and the drive roller, drive axle, or drive cylinder is sufficiently great.

According to a refinement of the invention, the force transfer element mentioned above is implemented as a drive belt. The at least one roller is thereby driven by means of the force transfer element at least partially enlacing the roller. The force transfer element accordingly has a double function, namely exerting an entraining force on a conveyed material supported on the roller and driving the roller about the axis of rotation.

The force transfer element or drive belt may be implemented as a flat belt, V-belt, or round belt.

According to a refinement of the invention, the at least one roller is part of a roller module. The arrangement accordingly includes at least one roller module and particularly a plurality of roller modules. The roller modules may be disposed one after another in columns and adjacent to each other in rows, that is, in a matrix pattern, as seen in the conveying direction.

Each roller module includes at least one drivable roller, particularly a plurality of drivable rollers. The roller module may include four drivable rollers, for example.

The roller modules are particularly inset in recesses or openings in the support structure of the arrangement. The roller modules themselves may include a support body having at least one recess or opening for receiving the at least one roller. The support body implements a particularly flat support surface toward the conveyor space. The support body may be made of or include a plate element, such as a metal plate.

The support structure of the arrangement and the support body of the roller module inset in the support structure are particularly flush with each other and implement a common support surface. A surface segment of the at least one roller of the at least one roller module protrudes out of the common support surface into the conveyor space.

The rollers of a roller module may be driven by a common drive. The rollers or groups of rollers of a roller module may also, however, be driven by separate drives.

According to a refinement of the invention, each roller module includes a drive for driving the rollers of the corresponding roller module. The drive or parts thereof may, however, also be disposed outside of the roller module in the arrangement.

The rollers of a roller module may be pivotable by means of a common pivot device. The rollers of a roller module are accordingly always identically oriented.

According to a refinement of the invention, each roller module includes a pivot device for pivoting the rollers of the corresponding roller module. The pivot device or parts thereof may, however, also be disposed outside of the roller module in the arrangement.

According to a refinement of the invention, the roller module itself is pivotable by means of a pivot device. The rollers of the roller module accordingly also pivot together with the roller module.

The roller module according to the present refinement particularly includes a circular support body implementing a circular support surface. The circular support body is pivotably or rotatably supported for rotating about the pivot axis in a circular recess or opening in the support structure of the arrangement. Such roller modules are also referred to as turntables.

The roller module may include one common connection interface to the vacuum generator for all rollers of the roller module. The roller module may, however, also include a plurality of connection interfaces for each roller or for groups of rollers of a roller module.

According to a refinement of the invention, for a roller module, at least two rollers may be connected to the vacuum generator by means of a common connection interface via a common axle in each case. The roller bodies of the at least two rollers are accordingly disposed spaced apart from each other along the common axis.

The arrangement further particularly includes a vacuum device for generating a vacuum at the cylindrical surface of the at least one roller. The vacuum device particularly includes lines, such as flexible hoses, for generating a vacuum at the cylindrical surface of the roller and for connecting to a vacuum generator. The vacuum generator may also be part of the arrangement.

Because conveyor systems typically already include a vacuum generator for other applications, it is also conceivable that the vacuum generator is disposed outside of the arrangement in the conveyor system.

The arrangement may be implemented as a separate device and may be disposed in a conveyor system, for example as a conveying and steering device or module for steering horizontally conveyed materials, for example between at least two conveyor devices. Such conveyor systems typically have a modular structure.

The arrangement may also, however, itself be part of a conveyor device for horizontally conveying conveyed materials. The rollers or roller modules of the arrangement may thus be integrated in the conveyor structure of the conveyor device and may be displaced with the conveyor structure.

The connection of the rollers to the vacuum generator may be made by means of a sliding contact, particularly a lateral sliding contact. The contact produces the connection between the connection interface being displaced at the conveying speed in the conveying direction and the stationary vacuum line. The sliding contact may be implemented in the form of a vacuum strip disposed parallel to the conveying direction of the conveyor structure.

The invention further relates to a conveyor system having at least one conveyor device for horizontally conveying conveyed materials and having an arrangement as described above for steering the horizontally conveyed materials parallel to the conveyor surface or in the conveyor plane.

The conveyor device includes a flat conveyor structure implementing a conveyor surface for horizontally conveying the conveyed materials. For a flat conveyor surface, the conveyor surface is also referred to as the conveyor plane.

The conveyor structure of the conveyor device may be a conveyor belt of a belt conveyor, a plate chain of a plate chain conveyor, a module belt of a module belt conveyor, a mat chain of a mat chain conveyor, or a roller conveyor.

The arrangement or the conveyor system particularly also includes a control device for pivoting the rollers or the roller modules about the pivot axis. The rollers may be pivotable into an arbitrary pivot position by means of the control device. It may also be provided that the rollers can be pivoted only between defined pivot positions by means of the control device. The pivot positions of the rollers are switched accordingly by means of the control device.

The rollers are able to be pivoted or switch particularly individually or in groups and particularly independently of the other rollers or the other groups of rollers of the arrangement. For roller modules, the modules are able to be pivoted or switched particularly individually, that is, independently of other roller modules of the arrangement.

The control device particularly also serves for driving the rollers about the axis of rotation thereof. Thus the speed and optionally also the direction of rotation of the rollers may be controlled by means of the control device.

Thus the conveyed materials are able to be steered not only by pivoting the rollers but also by the speed or the direction of rotation, particularly by different speeds or by different directions of rotation of the rollers.

The rollers are able to be driven particularly individually or in groups independently of the other rollers or the other groups of rollers of the arrangement. For roller modules, the rollers of a roller module are particularly able to be driven together, but particularly independently of the rollers of other roller modules of the arrangement.

The control device particularly also serves for generating a vacuum at the cylindrical surfaces of the rollers. The vacuum is able to be generated at individual rollers or at groups of rollers and independently of the other rollers or of the other groups of rollers of the arrangement. For roller modules, the vacuum is particularly able to be generated commonly at the rollers of a roller module, but particularly independently of the rollers of other roller modules of the arrangement.

The invention further relates to a method for steering horizontally conveyed materials by means of an arrangement described above.

The method is characterized in that a vacuum is generated in the region of the at least one vacuum opening at the cylindrical surface of the at least one driven roller for exerting a retaining and entraining force on a conveyed material supported on the at least one driven roller, such that the conveyed material is steered out of the previous conveying direction thereof by pivoting the at least one driven roller about the pivot axis thereof.

The conveying direction or previous conveying direction particularly means a main conveying direction in which the conveyed materials are conveyed to the arrangement or position changing arrangement.

The retaining and entraining force acts particularly well on a flexible piece good or a piece good packaged in a flexible packaging wrapper.

To this end, a vacuum is generated in the inner cavity of the axle by means of a vacuum generator, the vacuum proliferating through the continuous passage formed by the pass-through opening in the axle and the vacuum opening in the roller body to the cylindrical surface of the roller. A vacuum or induced draft is accordingly present at the cylindrical surface in the region of the vacuum opening. A conveyed material supported on the driven roller remains adhered to the roller due to the vacuum or induced draft and is conveyed onward by the roller in the direction of rotation of the roller.

The vacuum acts only on the vacuum openings disposed in a limited range of rotary orientation in the direction of rotation along the cylindrical surface. This is due to the limited extent in the direction of rotation of the pass-through opening facing toward the conveyor space. The range of rotary orientation or range of rotary angle may cover a circular sector of 25-40°, particularly of 30° (angle degrees). The range of rotary orientation is particularly disposed at the crest of the roller, where the roller maximally protrudes past the support surface into the conveyor space.

Because the range of rotary orientation is limited, the adhering of the conveyed material to the roller is also merely temporary. As the conveyed material is conveyed further out of the range of rotary orientation, the material is released from or peeled off of the roller and conveyed onward.

According to a refinement of the invention, a force transfer element at least partially enlacing the roller toward the conveyor space has increased friction against a conveyed, particularly rigid, material supported on the at least one driven roller. The conveyed material is correspondingly steered out of the previous conveying direction thereof by means of the entraining force acting on the conveyed material by pivoting the at least one driven roller about the pivot axis.

The drivable roller according to the invention or the arrangement according to the invention having the at least one drivable roller, as described above, is particularly applicable as a conveyor gate in a conveyor system for horizontally conveying conveyed materials. The conveyor gate particularly steers the conveyed materials from an infeed to one of two or more than two branching onward conveyors.

The drivable roller according to the invention or the arrangement according to the invention having the at least one drivable roller, as described above, is particularly applicable as a positioning device for changing the position of the conveyed materials in the conveyor space. The change in position may be a change in location of the conveyed materials transverse to the conveying direction. The change in position may be a change in location parallel to the conveying direction in the conveyor space caused by accelerating or decelerating the conveyed materials, and thereby particularly a distancing or approaching of the conveyed materials relative to each other or relative to parts of the conveyor device. The change in position may also be a rotation of the conveyed materials in the conveyor space. Combinations of the changes in position are also conceivable The rotating of a conveyed material in the conveyor space may take place by means of different pivot motions of the rollers or roller modules on which the conveyed material is supported.

The rotating of a conveyed material in the conveyor space may also take place due to different rotary velocities or rotary speeds and/or due to different directions of rotation of the rollers or the rollers of the roller modules on which the conveyed material is supported.

A combination of different pivot motions, speeds, or direction of rotation of the rollers or of the rollers of the roller modules is also conceivable for rotating the conveyed materials.

The drivable roller according to the invention or the arrangement according to the invention having the at least one drivable roller, as described above, is particularly applicable as a feeder for feeding conveyed materials to a conveyor device of the conveyor system.

The drivable roller according to the invention or the arrangement according to the invention having the at least one drivable roller, as described above, is particularly applicable as a dispensing or delivery device for dispensing or delivering conveyed materials from a conveyor device of the conveyor system. The conveyor system may accordingly be a sorting system for conveyed materials.

The conveyor system having an arrangement according to the invention may particularly also be designed for commissioning goods, particularly shipping goods, in internal logistics.

Due to the roller according to the invention and the associated arrangement, even lightweight, flexible, or pliable conveyed materials and conveyed materials packaged in flexible wrappers can be reliably steered in the conveyor plane. This is particularly the case at high conveying speeds, when higher inertial forces and aerodynamic effects make controlled changes in direction of the conveyed materials in the conveyor plane or conveyor surface more difficult.

The present concept of steering of conveyed materials in a conveyor plane or conveyor surface based on driven and pivotable rollers does not require any extensive changes to the conveyor system, thanks to the present invention. Only the steering rollers must be equipped with a corresponding vacuum device and modified accordingly. Because the vacuum generator is typically already present, only the corresponding connecting lines to the vacuum generator must be provided.

BRIEF DESCRIPTION OF THE DRAWINGS

The object of the invention is explained in further detail below using preferred embodiment examples shown in the attached drawings. They show, schematically in each case:

FIG. 4a-e: cross-section views of the roller according to FIG. 1 transverse to the axis of rotation;

DETAILED DESCRIPTION OF THE INVENTION

Figure 1:
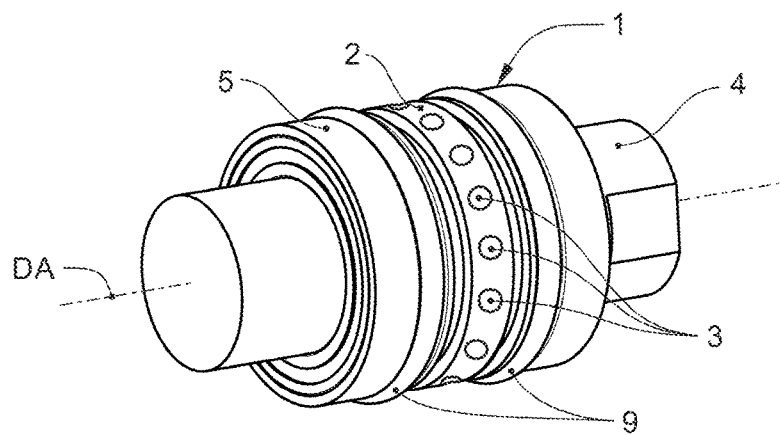
FIG. 1: a perspective view of a roller according to the invention.

The roller 1 according to FIGS. 1 through 5 includes an axle 4 and an annular roller body 5 rotatably supported about the axle 4 by means of ball bearings 10. A gap seal 12 is disposed between the roller body 5 and the axle 4. The axle 4 has an inner cavity 6 connected to a vacuum generator 16 by means of a connection interface 11 (see FIG. 5). The connection interface 11 and the vacuum generator 16 are part of a vacuum device. A pass-through opening 7 leads radially outward from the inner cavity 6 of the axle 4.

The roller body 5 includes a cylindrical surface 2. A plurality of vacuum openings 3 are oriented radially outward toward the cylindrical surface 2, starting from the axle 4, and open into the cylindrical surface 2. The vacuum openings 3 are disposed annularly and uniformly spaced apart from each other about the axle 4. The vacuum openings 3 accordingly lie in a common plane disposed perpendicular to the axis of rotation DA of the roller body 5. A uniform arrangement of the vacuum openings 3 along the cylindrical surface 2 leads to a vacuum acting uniformly on the cylindrical surface 2.

On both sides of the annularly disposed vacuum openings 3, one force transfer element 9 each implemented as an annular plastic element having a circular cross section enlaces the roller body 5. Each force transfer element 9 runs in an annular outer groove inset into the cylindrical surface 2 of the roller body 5 parallel to the direction of rotation DR of the roller 1.

By rotating the roller body 5 relative to the axle 4, the vacuum openings 3 are displaced past the pass-through opening 7 (see FIGS. 4a through 4e). When a vacuum opening 3 contacts the pass-through opening 7, a continuous passage 8 is formed and conducts a vacuum generated in the inner cavity 6 of the axle 4 to the cylindrical surface 2.

The pass-through opening 7 has a greater extent or width than the vacuum opening 3 at the outer surface of the axle 4 in the direction of rotation DR of the roller body 5, where the pass-through opening contacts the roller body 5 and the vacuum opening 3 in the roller body. The continuous passage 8 between the pass-through opening 7 and the corresponding vacuum opening 3 is thereby formed not only in a single rotary orientation of the roller body 5, but also across a range of rotary orientation or rotary angle range DB (see FIG. 4a).

It is evident from FIGS. 4a through 4e how a vacuum opening 3 is displaced past the pass-through opening 7 along a circular arc as the roller body 5 rotates about the axle 4 and temporarily forms a continuous passage 8 together with the pass-through opening. The width of the pass-through opening 7 at the outer surface of the axle 4 in the direction of rotation DR of the roller body 5 is within a range of rotary orientation or rotational angle range DB covering a circular sector by means of the circular arc. The vacuum opening 3 now forms a continuous passage 8 together with the pass-through opening 7 within the range of rotary orientation DB.

Simultaneous to the exiting of the range of rotary orientation DB, and thus to the eliminating of the continuous passage 8, a subsequent vacuum opening 3 enters the range of rotary orientation DB and again forms a continuous passage 8 together with the stationary pass-through opening 7. It is thus ensured that a continuous passage 8 is always formed in the range of rotary orientation.

Therefore, a vacuum is always implemented in the region of the cylindrical surface 2 only in the range of rotary orientation by means of at least one vacuum opening 3.

It is possible that two or even more than two vacuum openings 3 are present in the range of rotary orientation DB and implement a vacuum in the region of the cylindrical surface 2 at the same time.

The stationary range of rotary orientation DB is oriented toward the conveyor space. The circular arc of the cylindrical surface 2 defined by the range of rotary orientation DB is present above a support surface 44.1 in the conveyor space.

Figure 2:
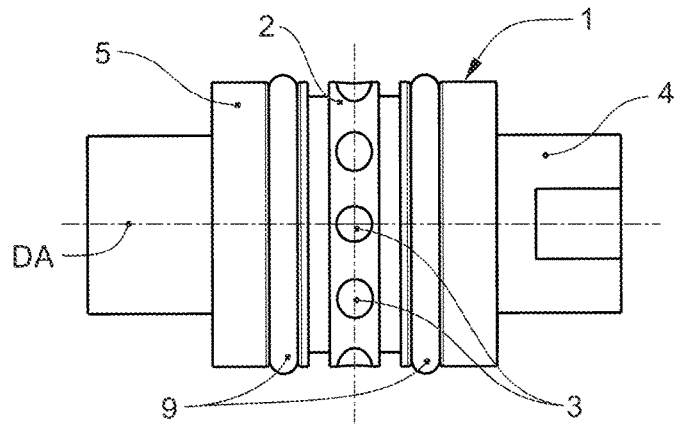
FIG. 2: a side view of the roller according to FIG. 1.
Figure 3:
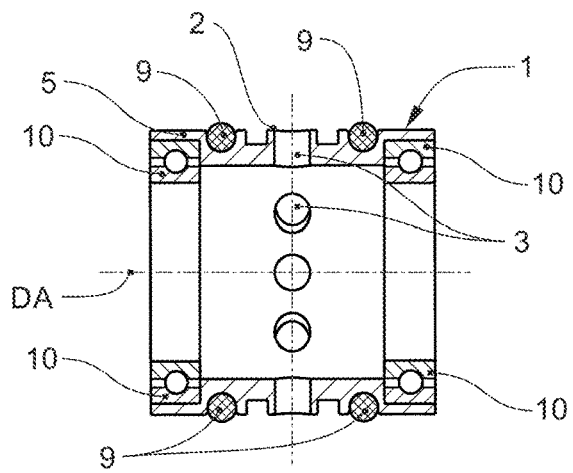
FIG. 3: a cross-section view of the roller body of the roller according to FIG. 1 lengthwise to the axis of rotation.
Figure 5:
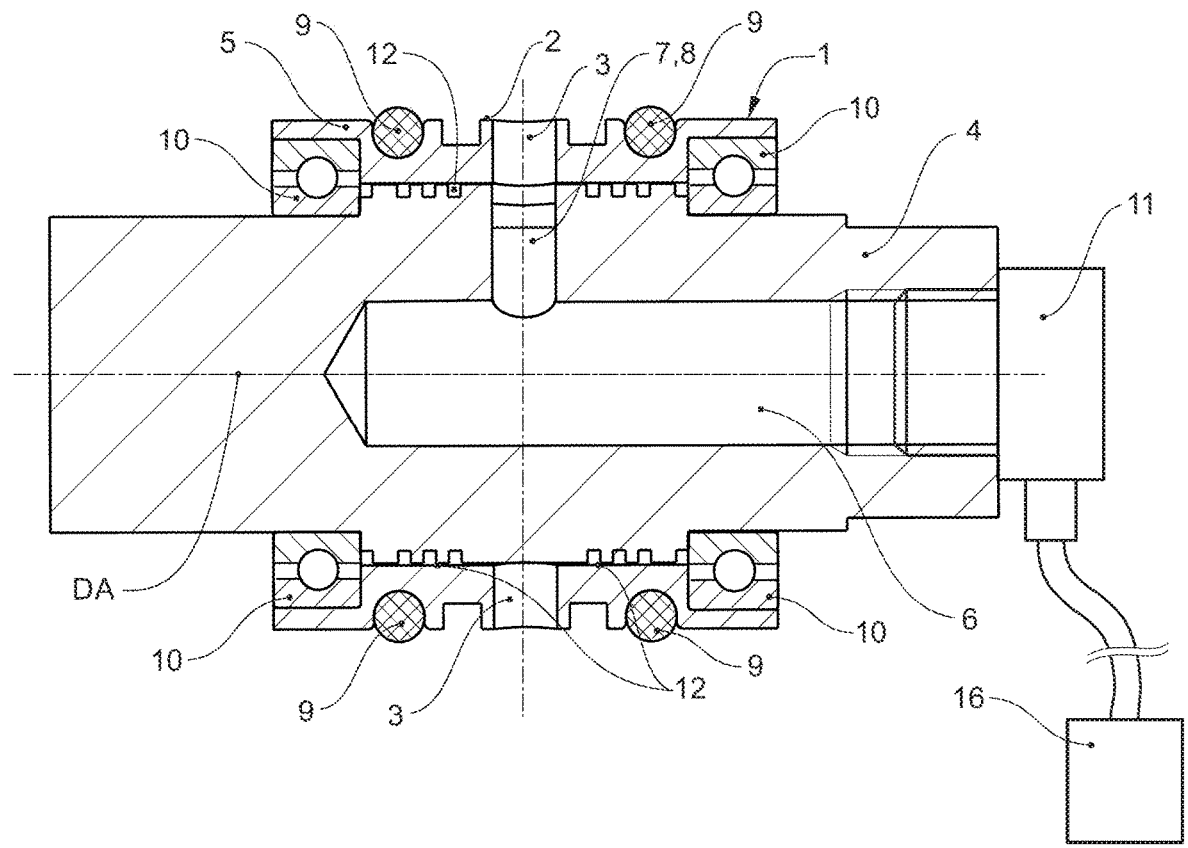
FIG. 5: a cross-section view of the roller according to FIG. 1 lengthwise to the axis of rotation.
Figure 6:
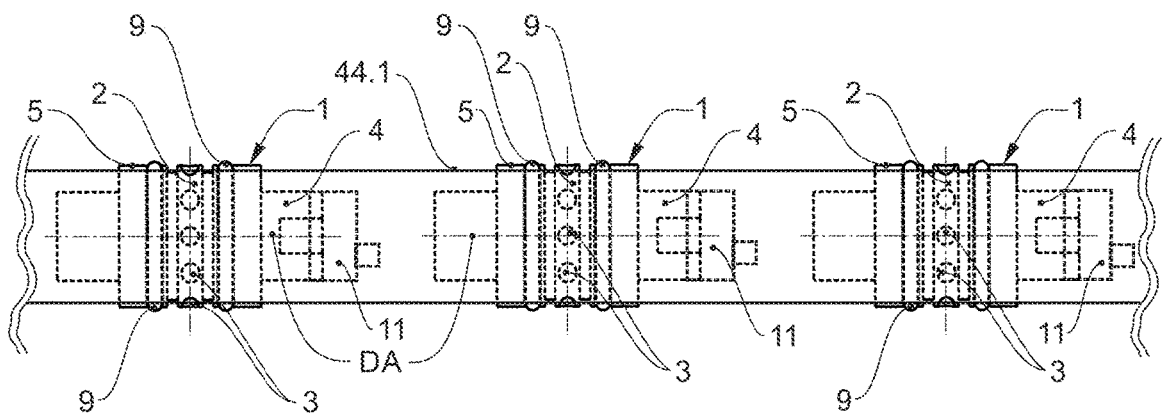
FIG. 6: a side view of a roller arrangement.

FIG. 6 shows a position changing arrangement having a plurality of rollers 1 according to FIGS. 1 through 3, the rollers being inset in recesses of a flat support structure 44.1 and a roller segment thereof protruding past the support surface of the support structure 44.1 into the conveyor space.

FIGS. 7 through 12 show various embodiments for driving the rollers 1 according to the invention, hereafter referred to as steering rollers 1, as described for example using FIGS. 1 through 6.

The embodiments according to FIGS. 7 through 10 are characterized by a belt drive 42.1, 42.2, 42.3 having a circumferential, that is, endless drive belt 9, 13. The belt drive 42.1, 42.2, 42.3 includes a driven drive roller or drive shaft 14 partially enlaced by the drive belt 9, 13. The drive belt 9, 13 in turn partially enlaces the steering roller 1. The drive force for rotating the steering rollers 1 is transferred from the drive roller or drive shaft 14 via the drive belt 9, 13 to the steering roller 1.

Figure 7:
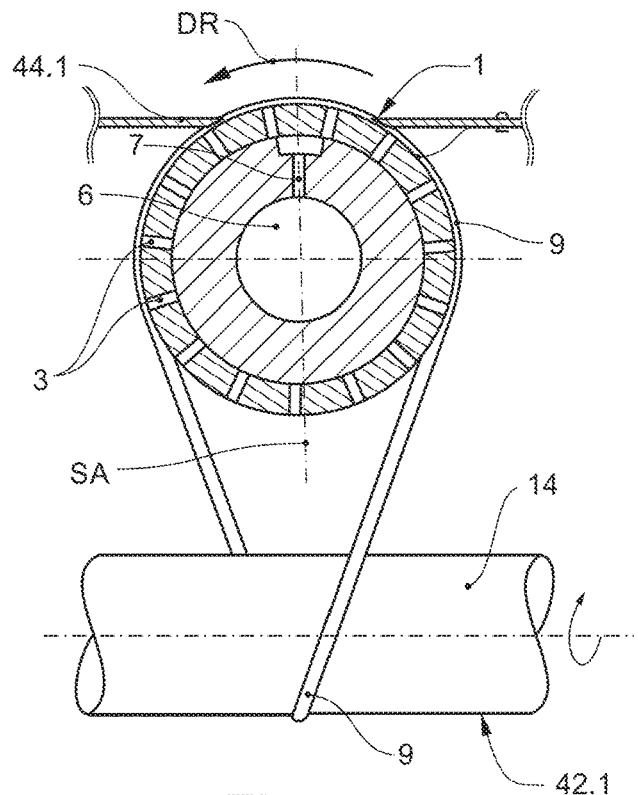
FIG. 7: a combined side and cross-section view of a roller drive.
Figure 8:
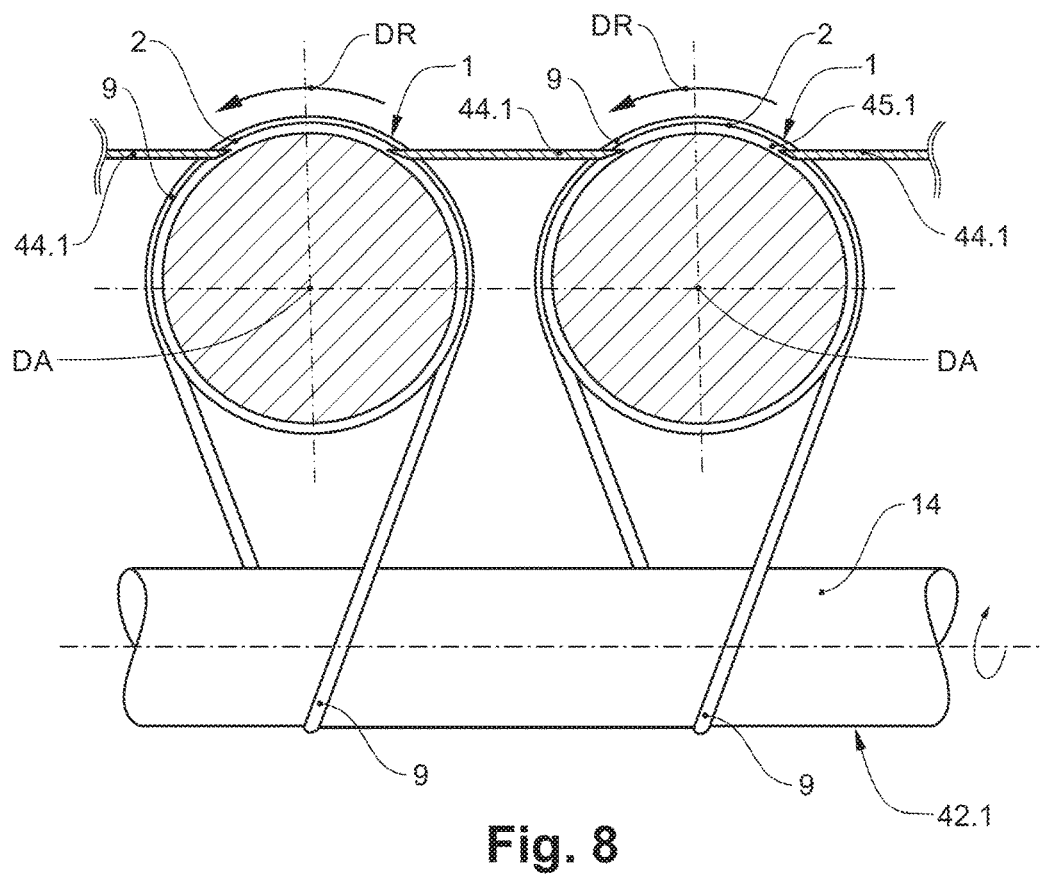
FIG. 8: a side view of a further roller drive.
Figure 9:
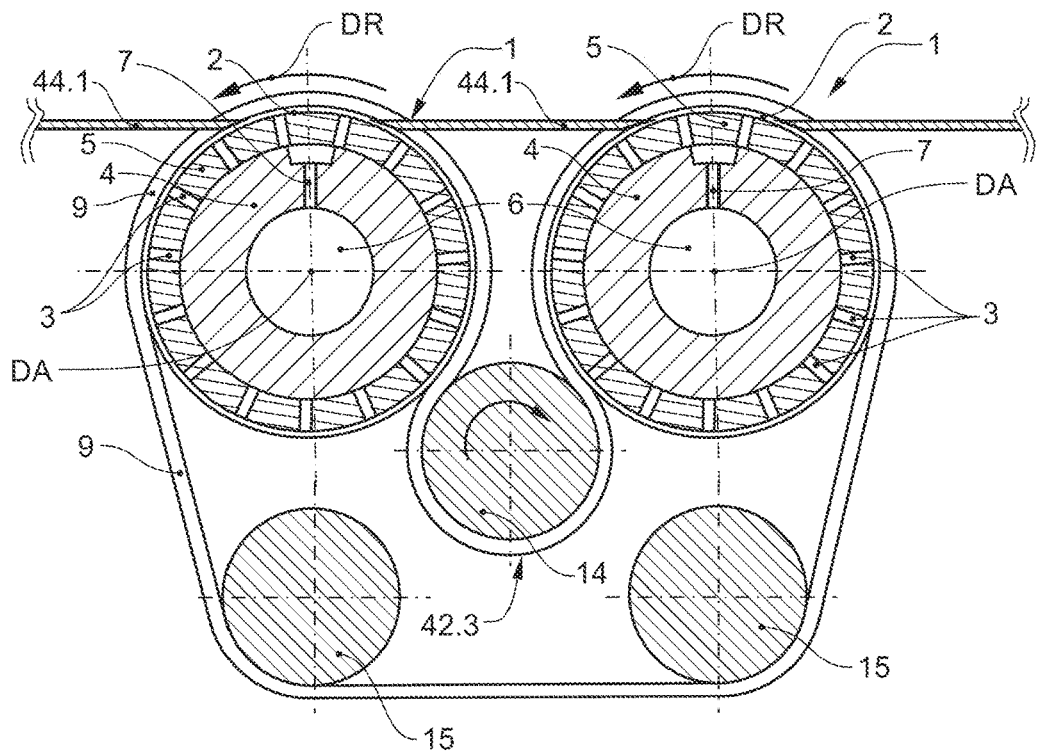
FIG. 9: a cross-section view of a further roller drive.

The embodiments according to FIGS. 7 through 9 also have in common that the drive belt 9 simultaneously corresponds to the force transfer element for exerting an entraining force on a conveyed material 20 supported on the steering roller 1. The drive belt 9 is guided accordingly across the roller segment of the steering roller 1 protruding into the conveyor space.

According to the embodiment from FIG. 7, the drive belt 9 may be a round belt and enlaces a stationary drive shaft 14. The drive shaft 14 is disposed below the steering roller 1. By pivoting the steering roller 1 about the pivot axis SA, the drive belt 9 is twisted. This has the advantage that the drive shaft 14 itself need not be pivoted as well.

The arrangement according to FIG. 8 corresponds to the embodiment from FIG. 7, with the difference that two steering rollers 1 are driven by a common drive shaft 14. FIG. 8 also shows the support structure 44.1 out of which the steering rollers 1 protrude into the conveyor space. The drive shaft 14 is disposed, as in FIG. 7, below the steering roller 1 and thus below the support structure 44.1 and the conveyor space.

According to the embodiment from FIG. 9, two adjacent steering rollers 1 are driven by a common drive belt 9. The drive belt 9 is driven in turn by a drive roller 14. The drive roller 14 is disposed between the axes of rotation DA of the two steering rollers 1 and below the roller midplane passing through the two axes of rotation DA.

The drive belt 9 is deflected upward to a first steering roller 1 by means of a first deflecting roller 15 and enlaces the steering roller 1 at least in the region of a range of rotary orientation. That is, the drive belt 9 enlaces the roller segment of the first steering roller 1 protruding above the conveyor surface into the conveyor space, analogous to FIGS. 7 and 8. On the other side of the roller, the drive belt 9 is guided downward again after enlacing more than half of the circumference of the first steering roller 1 and partially enlaces the drive roller 14. After partially enlacing the drive roller 14 around ⅔ of the circumference of the roller, the drive belt is again deflected upward. The belt now enlaces the second steering roller 1 in at least the range of rotary orientation. That is, the drive belt 9 enlaces the roller segment of the second steering roller 1 protruding above the conveyor surface into the conveyor space, analogous to the first steering roller 1. On the other side of the roller, the drive belt 9 is again deflected downward toward a second deflecting roller 15 after enlacing more than half the circumference of the second steering roller 1. At the second deflecting roller 15, the drive belt 9 is again deflected to the first deflecting roller 15.

The present embodiment is characterized by a large enlacing angle both at the two steering rollers 1 and at the drive roller 14.

Figure 10:
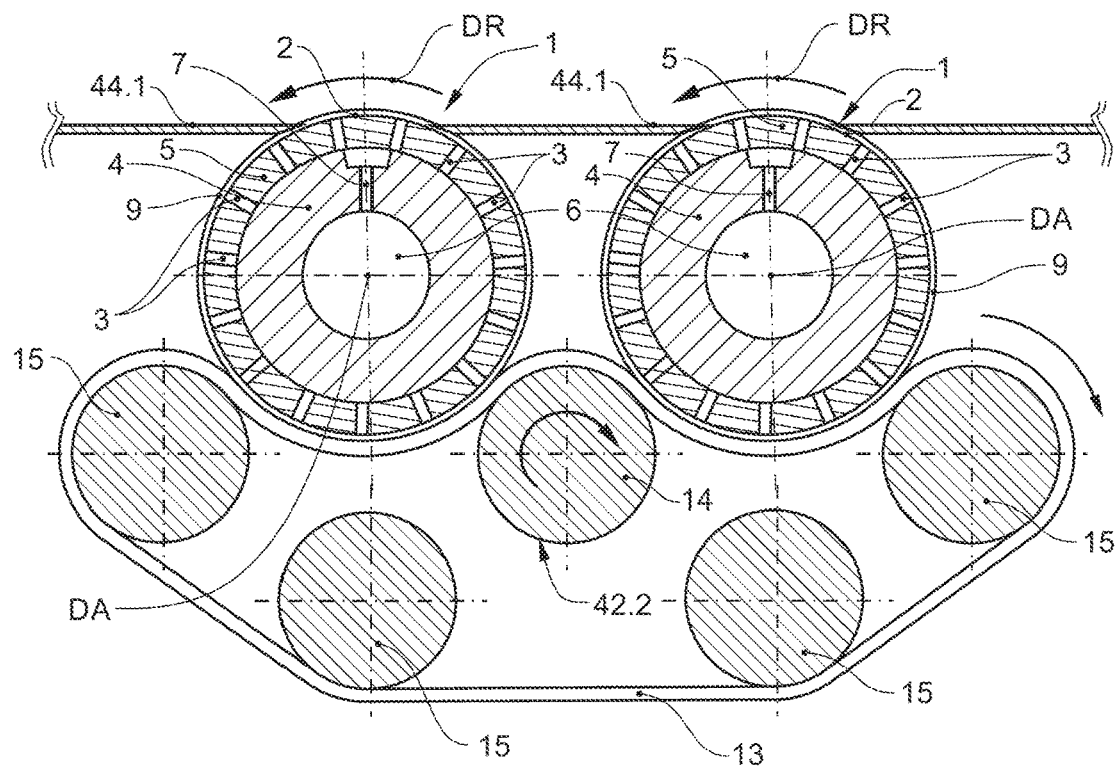
FIG. 10: a cross-section view of a further roller drive.

According to the embodiment from FIG. 10, two adjacent steering rollers 1 are also driven by a common drive belt 13. The drive belt 13 is driven in turn by a drive roller 14. The drive roller 14 is disposed between the axes of rotation DA of the two steering rollers 1 and below the roller midplane passing through the two axes of rotation DA, analogous to the embodiment from FIG. 9.

Unlike the embodiment from FIG. 9, however, the drive belt 13 is guided below the steering rollers 1 and in particular is not guided through the range of rotary orientation of the steering rollers 1 protruding into the conveyor space and not across the roller segment protruding past the conveyor surface into the conveyor space.

Rather, the drive belt partially enlaces a deflecting roller 15 or drive roller 14 and a steering roller 1 alternately in a horizontally oriented wave pattern. Thus the drive belt 13 is first guided above a first deflecting roller 15, then below a first steering roller 1, then above the drive roller 14, then again below the second steering roller 1, and subsequently again above a second deflecting roller 15. Each of the steering rollers 1, 14, 15 is partially enlaced by the drive belt 13.

The present embodiment is characterized in that the belt drive 42.2 is disposed entirely below the support structure 44.1.

Figure 11:
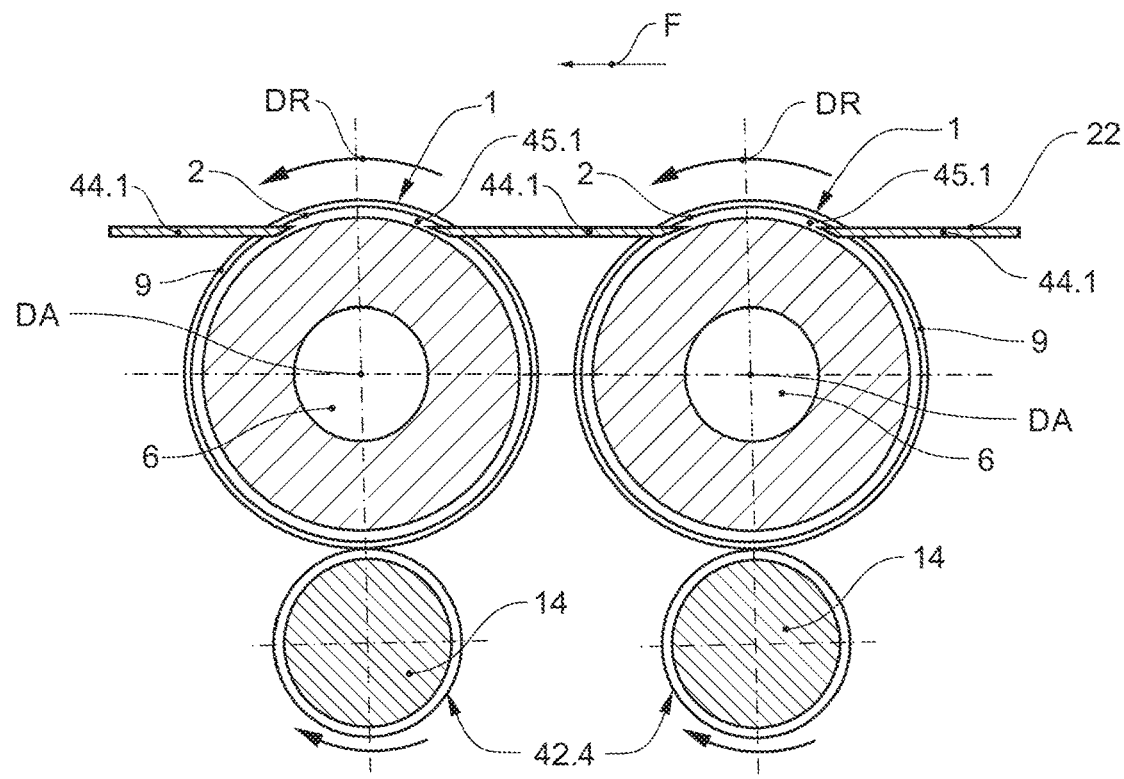
FIG. 11: a cross-section view of a further roller drive.

According to the embodiment from FIG. 11, the steering roller 1 is driven directly by a drive roller 14 of a drive 42.4. The drive roller is disposed at a bottom crest of the steering roller 1. In the present case, two adjacent steering rollers 1 are each driven by means of separate drive rollers 14. The two drive rollers 14 may, however, be coupled by technical drive means, for example by means of a belt, a chain, or gears.

Figure 12:
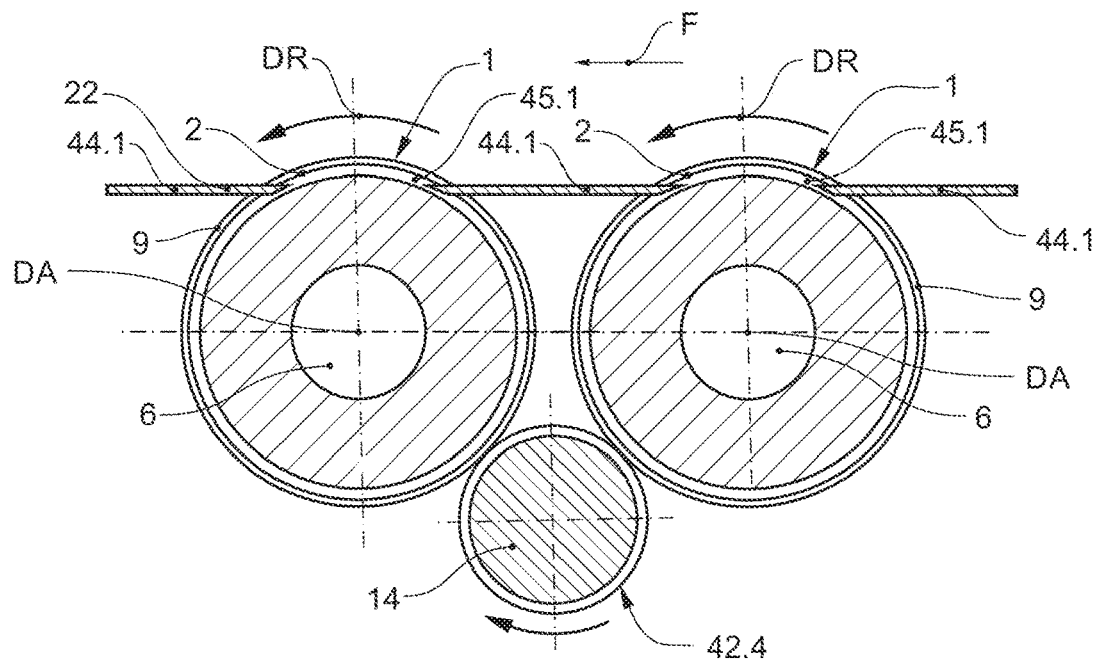
FIG. 12: a cross-section view of a further roller drive.

According to the embodiment from FIG. 12, two adjacent steering rollers 1 are driven directly by a common drive roller 14 of a drive 42.4. The drive roller 14 is disposed between the axes of rotation DA of the two steering rollers 1 and below the roller midplane passing through the two axes of rotation DA, analogous to the embodiments from FIGS. 9 and 10. The difference is that the drive roller 14 according to FIG. 12 directly drives the steering rollers 1.

The drive roller 14 accordingly implements a particularly linear drive contact to each of the steering rollers 1.

Figure 13:
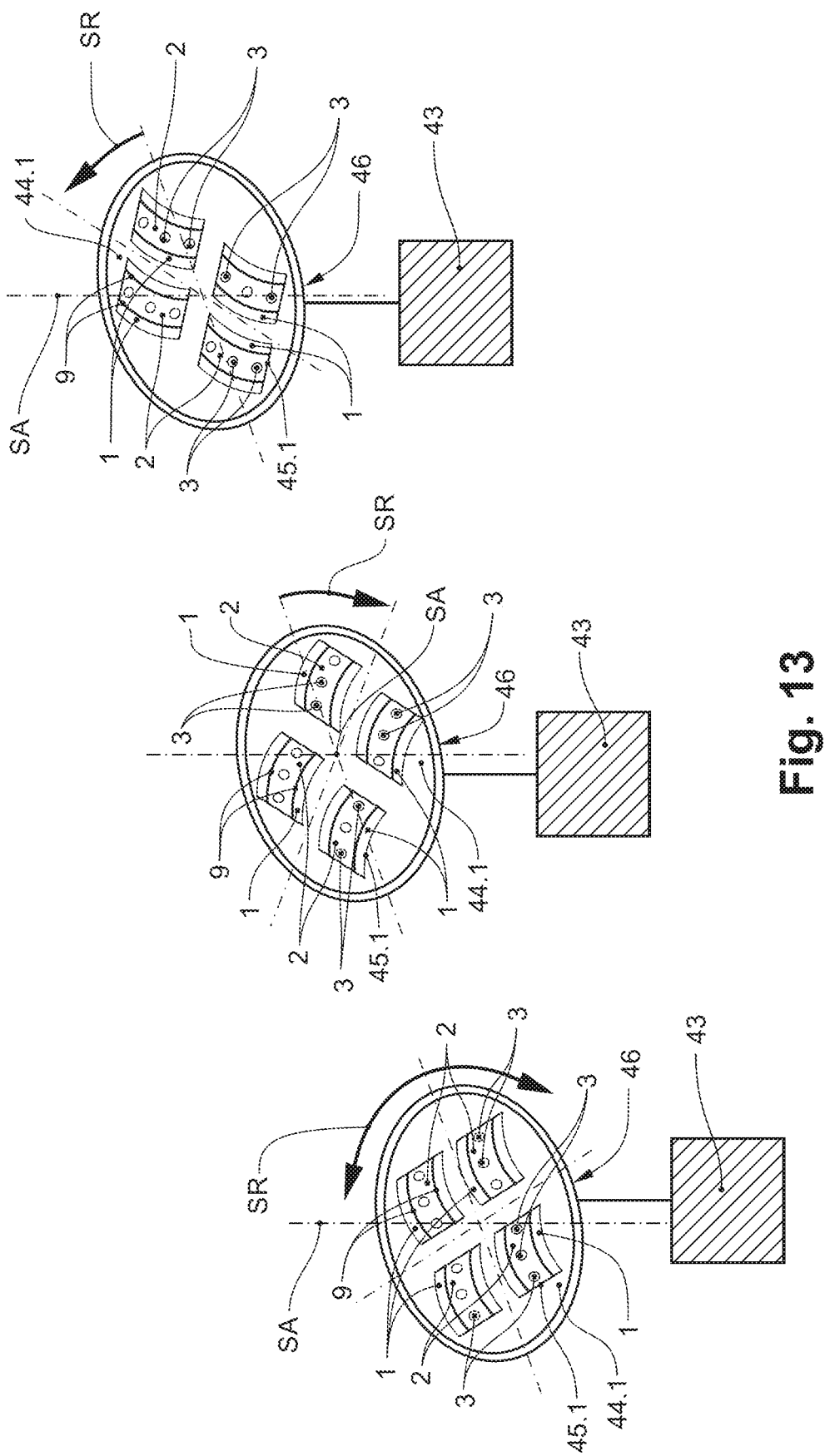
FIG. 13: perspective views of roller modules in various pivot positions.

FIG. 13 shows a roller module 46 implemented as a turntable in various pivot positions. The roller module 46 includes a circular or saucer-shaped support body 44.1 having four recesses 45.1 in each of which a roller 1 is inset. A roller segment of the rollers 1 protrudes past the support surface of the support body 44.1 such that a conveyed material 20 supported on the roller module 46 is supported by the rollers 1.

The roller module 46 is pivotably supported about a pivot axis SA in the pivot direction SR by means of a pivot device 43 (see also FIG. 14*a*-14*e*). The pivoting of the rollers 1 thus takes place by means of pivoting the roller module 46.

Figure 14A:
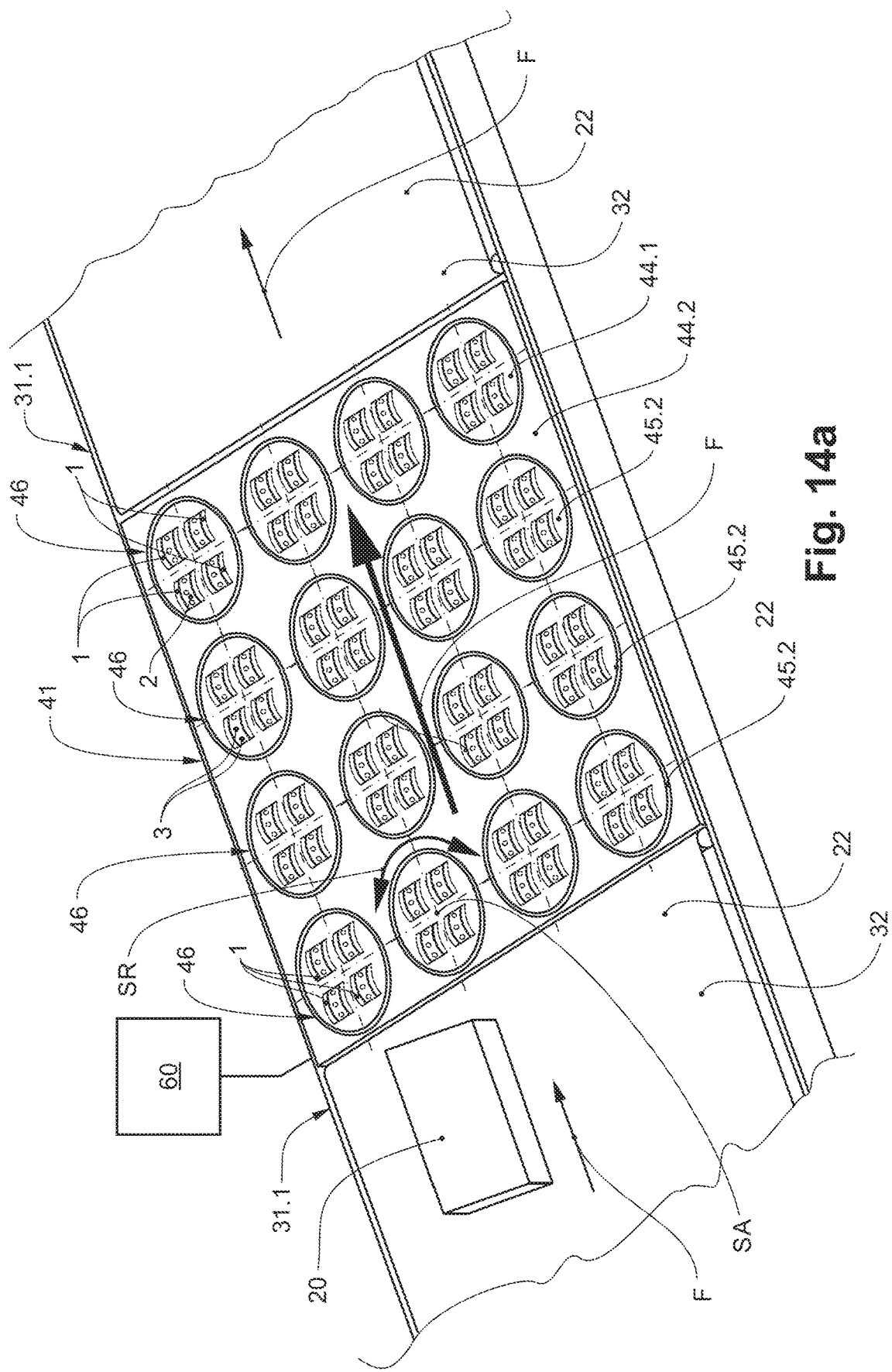
FIG. 14a-c: perspective views of a position changing arrangement in a conveyor system having roller modules in various pivot positions.
Figure 14B:
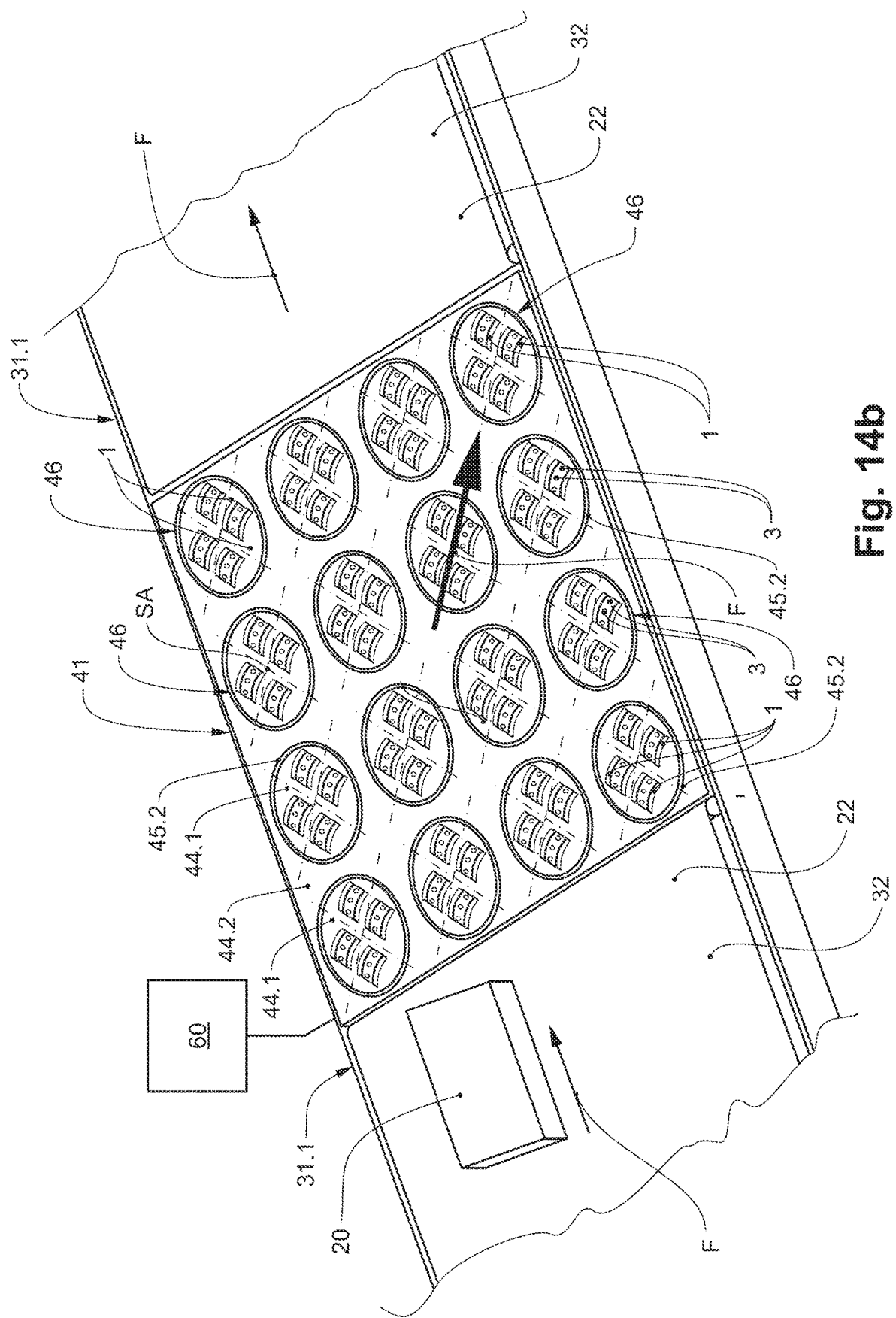
Figure 14C:
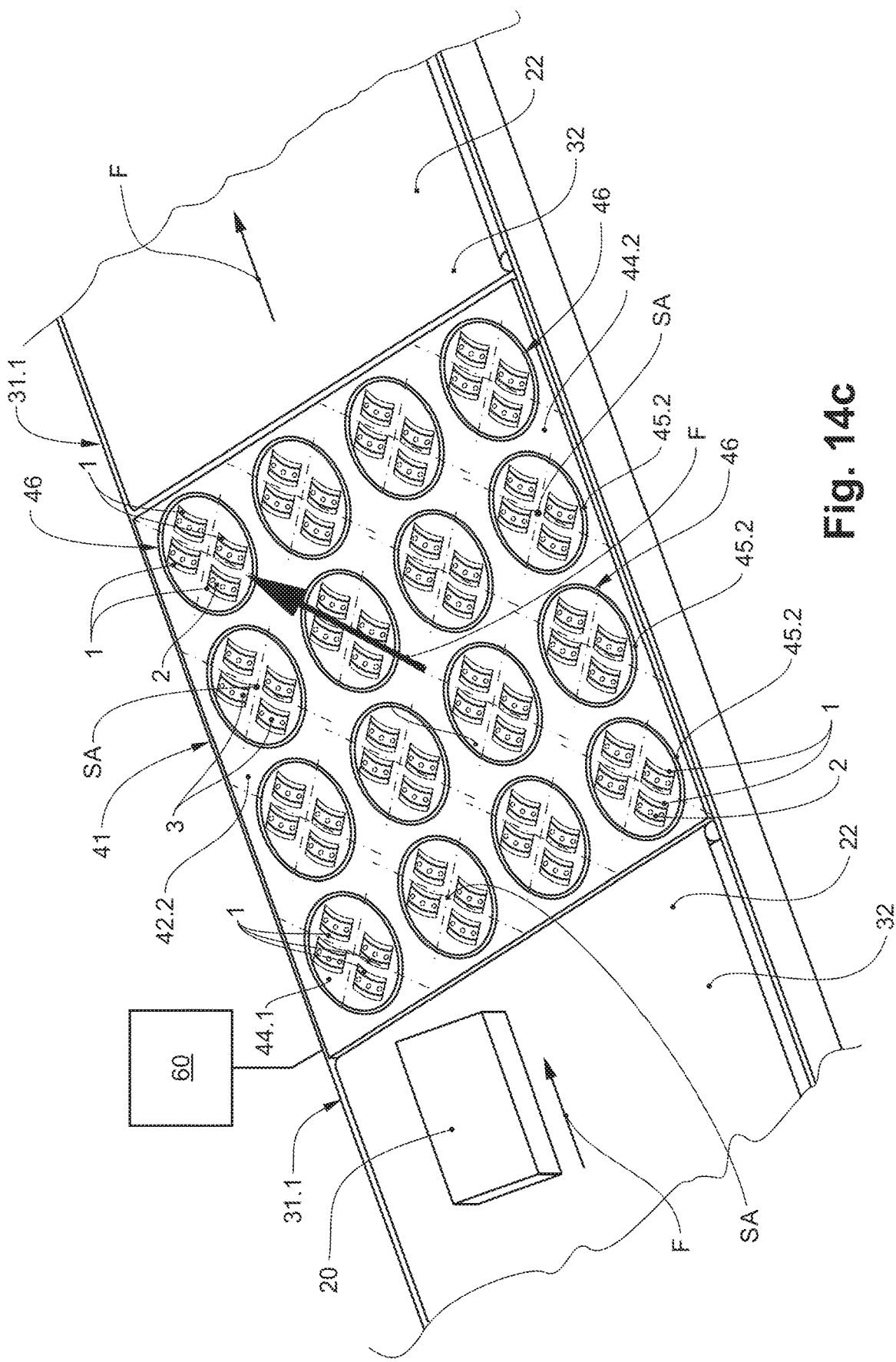

FIGS. 14*a* to 14*c* show an embodiment of a position changing arrangement 41 according to the invention having a flat support structure 44.2 in which a plurality of roller modules 46 having circular support bodies 44.1, as previously described in conjunction with FIG. 13, are inset by means of recesses 45.2 in columns and rows and uniformly spaced apart from each other.

The support surfaces of the support body 44.1 are disposed flush with the support surface of the support structure 44.2. The support surfaces of the support body 44.1 and of the support structure 44.2 are therefore in a common support plane.

The roller modules 46 are pivotably supported about the pivot axis SA relative to the support structure 44.2.

In FIG. 14*a*, the tangential direction of rotation DR of the rollers 1 runs parallel to the main conveying direction F. The conveyed materials 20 are conveyed accordingly by the rollers 1 or the roller modules 46 of the position changing arrangement 41 in the main conveying direction F.

The position changing arrangement 41 and accordingly the pivot position of the roller modules 46 is controlled by means of a control device 60. Furthermore, the rotary velocity or rotary speed of the individual rollers 1 or the rollers 1 of a roller module 46 and the direction of rotation thereof may be controlled by means of the control device 60.

In FIG. 14*b*, the rollers 1 or the roller modules 46 are pivoted to the right and the tangential direction of rotation DR of the rollers 1 runs at an angle to the main conveying direction F and faces toward the right as seen in the main conveying direction F.

In FIG. 14*c*, the rollers 1 or the roller modules 46 are pivoted to the left and the tangential direction of rotation DR of the rollers 1 also runs at an angle to the main conveying direction F, but faces toward the left as seen in the main conveying direction F.

An infeed conveyor 31.1 having a flat conveyor structure 32, such as a conveyor belt, and having a conveyor surface 22 on which the conveyed materials 20 are conveyed in the main conveying direction F of the position changing arrangement 41 is disposed upstream of the position changing arrangement 41. An onward conveyor 31.1 having a flat conveyor structure 32, such as a conveyor belt, and having a conveyor surface 22 on which conveyed materials 20 transferred from the position changing arrangement 41 are conveyed onward in the main conveying direction F is disposed downstream, subsequently to the position changing arrangement 41.

The conveyor surfaces 22 of the infeed and onward conveyors 31.1 are particularly flush with the support surface of the support structure 44.2 of the position changing arrangement 41, that is, the surfaces lie in one plane.

The position changing arrangement 41 according to FIGS. 14*a* through 14*c* can be used, for example, for discharging or dispensing conveyed materials 20 at a discharge or dispensing station, respectively.

According to the embodiment of FIGS. 15*a* through 15*d*, the position changing arrangement, such as is shown in FIGS. 14*a* through 14*c*, is a positioning device 51 for positioning the conveyed materials 20 in the conveyor space of a conveyor 31.1 for horizontally conveying conveyed materials 20, such as a belt conveyor.

Figure 15A:
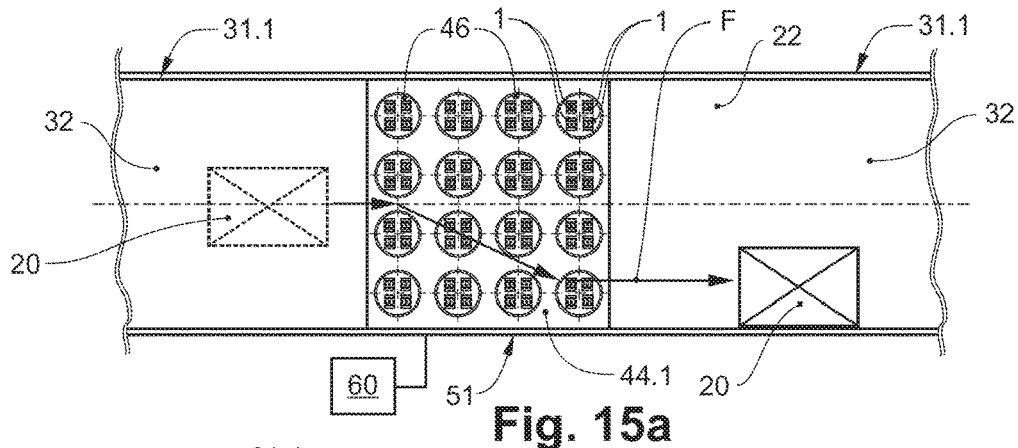
FIG. 15a-d: plan views of a position changing arrangement in a conveyor system having roller modules in various pivot positions.
Figure 15B:
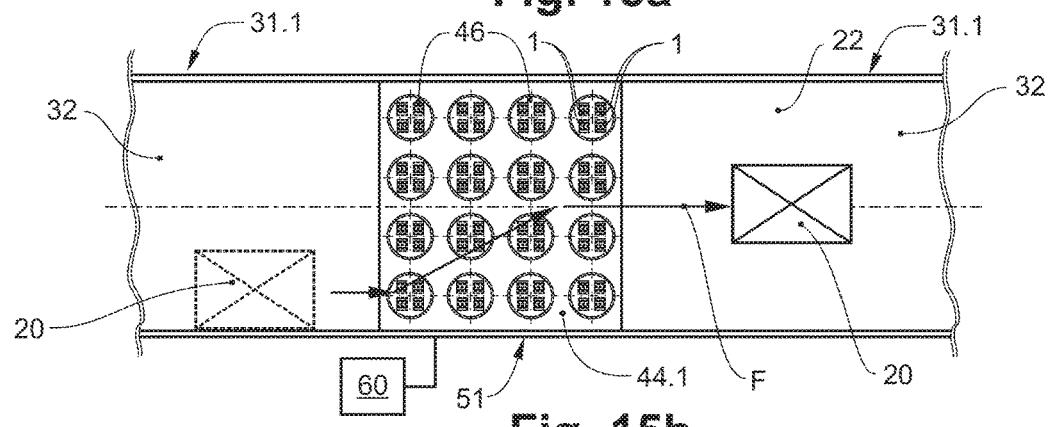

The positioning may be a change in position of the conveyed materials 20 transverse to the main conveying direction F by pivoting the roller modules 46 (see FIGS. 15*a* and 15*b*).

Figure 15C:
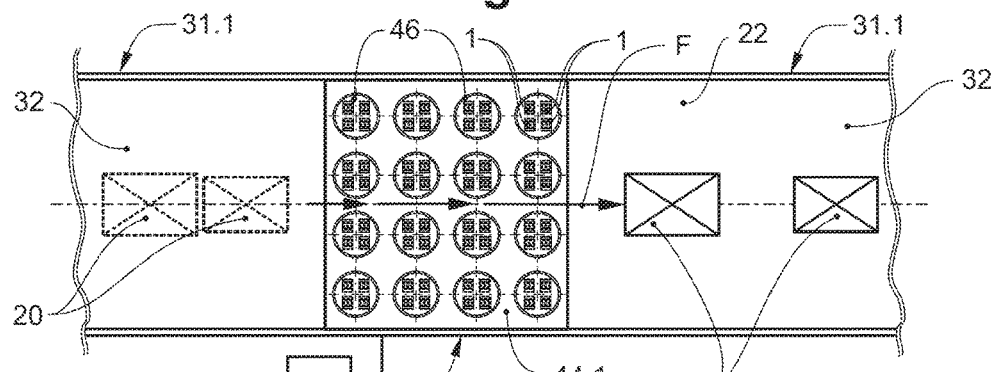

The positioning may also be a change in position of the conveyed materials 20 relative to a different conveyed material 20 along the main conveying direction F by accelerating or decelerating the conveyed materials 20 by means of the roller modules 46 (see FIG. 15*c*).

Figure 15D:
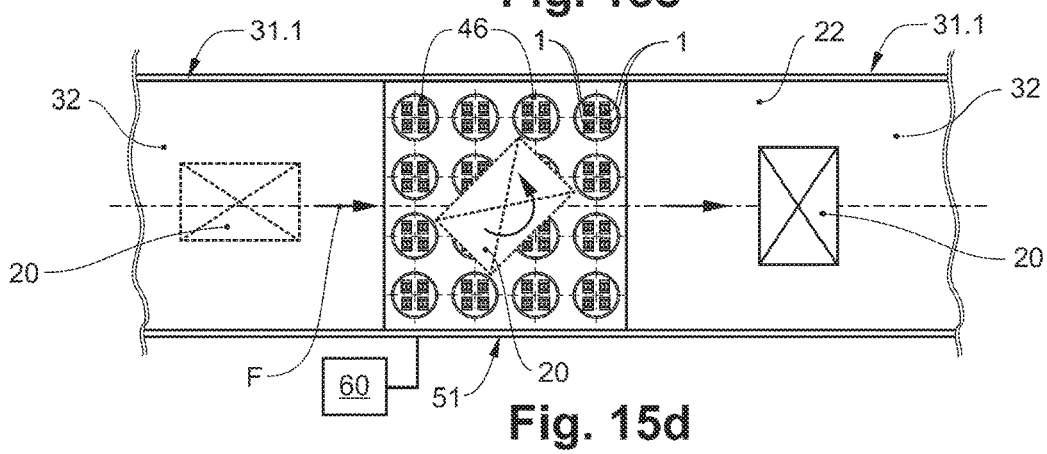

The positioning may also be a rotating of the conveyed materials 20 by individually pivoting the roller modules 46 (see FIG. 15*d*).

Furthermore, rotating of the conveyed material 20 may also take place by means of different rotary speeds of the individual rollers 1 or the rollers 1 of a roller module 46, and by a different direction of rotation of the rollers on which the conveyed material 20 is supported.

Figure 16:
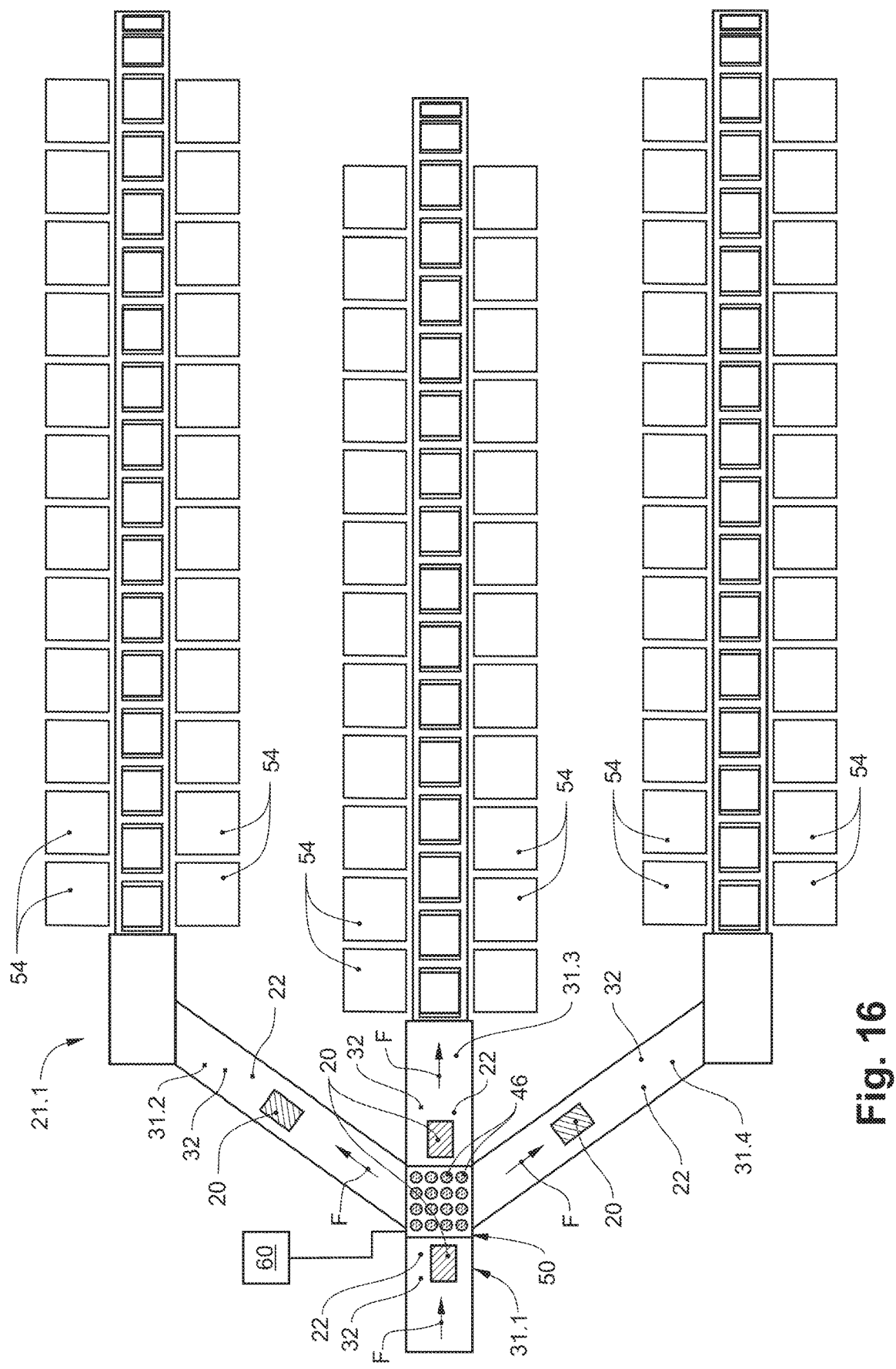
FIG. 16: a plan view of a conveyor system having a conveyor gate.

FIG. 16 shows a conveyor system 21.1 having a position changing arrangement, such as is shown in FIGS. 14*a* through 14*c*, here implementing a conveyor gate 50 for steering the conveyed materials 20 from an infeed conveyor 31.1 to in each case one onward conveyor 31.2, 31.3, 31.4 of the infeed conveyor 31.1 branching in the region of the conveyor gate 50. Depending on the pivot position of the rollers 1 or the roller modules 46, the conveyed materials 20 are steered to the left onto a first branching onward conveyor 31.2, straight ahead onto a second branching onward conveyor 31.3, or to the right onto a third branching conveyor 31.4.

The three onward conveyors 31.2, 31.3, 31.4 convey the conveyed materials 20 in the present example to each dispensing or delivering zone having a plurality of dispensing or delivery stations 54 at which the conveyed materials 20 may be dispensed or delivered. Of course, the conveyor gate 50 may also be used for any other arbitrary applications in the field of horizontal conveying.

The conveyor gate 50 is controlled accordingly by means of a control device 60.

Figure 17:
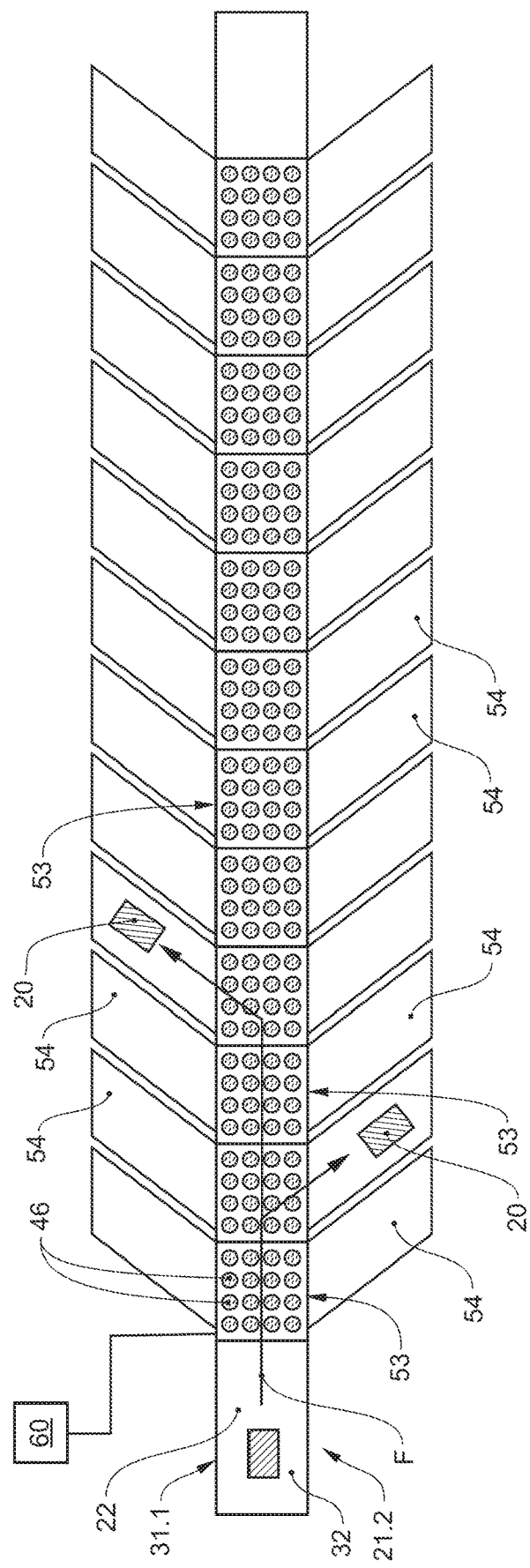
FIG. 17: a plan view of a sorting system having a plurality of dispensing or delivery devices for dispensing or delivering conveyed materials.

FIG. 17 shows a conveyor system 21.2 implemented as a sorter. The conveyor system 21.2 includes an infeed conveyor 31.1 having a flat conveyor structure 32 for horizontally conveying the conveyed materials 20. The infeed conveyor 31.1 conveys the conveyed materials 20 into a dispensing or delivering zone including a plurality of dispensing or delivery stations 54 disposed one after another. The conveyed materials 20 may be dispensed or delivered laterally to the left or right at the dispensing or delivery stations 54 or may be conveyed onward straight ahead. A position changing arrangement having the function of a dispensing or delivering device 53 is disposed at each dispensing or delivery station. The conveyed materials 20 are dispensed or delivered to the left or right or conveyed onward straight ahead by a corresponding pivot position of the rollers 1 or roller modules 46.

The dispensing devices 53 are controlled accordingly by means of a control device 60.

Figure 18:
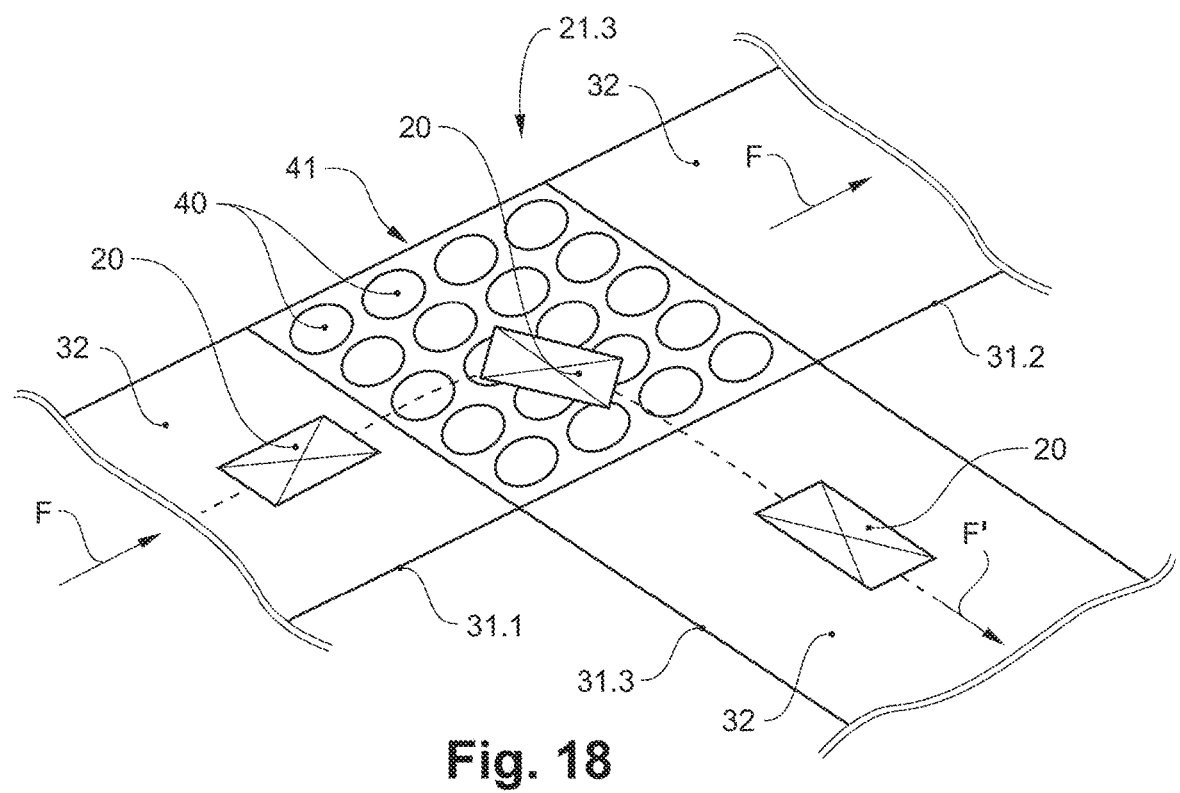
FIG. 18: perspective view of a further conveyor system having a position changing arrangement in the function of a conveyor gate.
Figure 19:
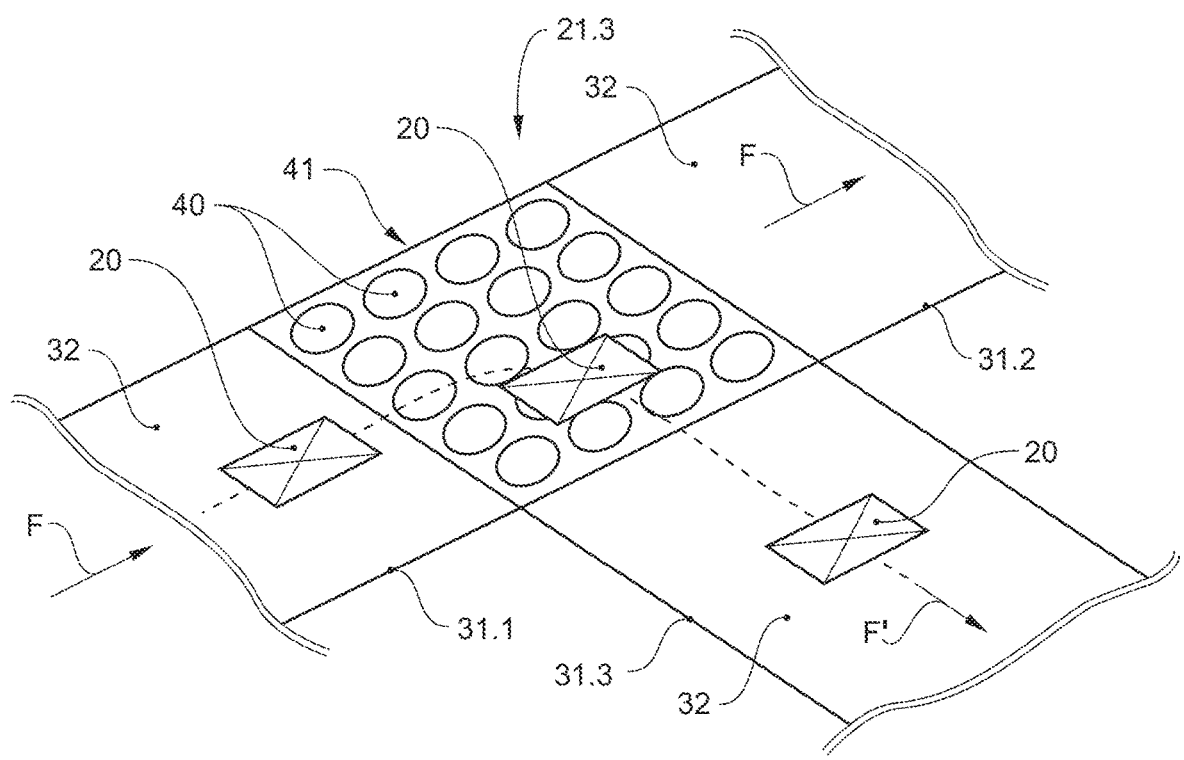
FIG. 19: the conveyor system according to FIG. 18 having an alternative deflection of the conveyed materials.

FIGS. 18 and 19 show a conveyor system 21.3 having a position changing arrangement 41, such as is shown in FIGS. 14*a* through 14*c*, here implementing a conveyor gate for steering the conveyed materials 20 from an infeed conveyor 31.1 to in each case one onward conveyor 31.2, 31.3 of the infeed conveyor 31.1 branching in the region of the conveyor gate. The infeed conveyor 31.1 and the two onward conveyors 31.2, 31.3 each include a flat conveyor structure, such as a conveyor belt.

The conveyor devices F, F' of the two onward conveyors 31.2, 31.3 are at right angles to each other, wherein the conveying direction F of a first onward conveyor 31.2 corresponds to the main conveying direction F of the infeed conveyor 31.1. The conveyed material 20 is accordingly deflected at a right angle from the infeed conveyor 31.1 onto the second onward conveyor 31.3.

The conveyed materials 20 are letters in the present example. As indicated above, other materials may also be conveyed.

According to FIG. 18, the conveyed material 20 is rotated simultaneously in the conveying direction F' of the second onward conveyor 31.3 when deflecting by 90° (angle degrees), so that the longitudinal axis of the conveyed material 20 always runs parallel to the current conveying direction. The change in position of the conveyed material 20 therefore corresponds to a combination of a change in the conveying direction by 90° (angle degrees) and a rotating of the conveyed material 20 also by 90°.

The deflecting of the conveyed material 20 while simultaneously rotating the same takes place both by pivoting the rollers 1 or roller modules 46 about a pivot axis and by different rotary speeds of the rollers 1 or the rollers 1 of the individual roller modules 46 on which the conveyed material 20 is supported. The rollers 1 may optionally also have a different direction of rotation.

According to FIG. 19, when deflecting the conveyed material 20, only a change in the conveying direction F of the conveyed material 20 by 90° (angle degrees) takes place, without changing the orientation thereof. The deflecting takes place here, for example, exclusively by pivoting about the pivot axis the corresponding rollers 1 or roller modules 46 on which the conveyed material 20 is supported.

The invention claimed is:

1. An arrangement for use in a conveyor system for steering conveyed materials conveyed horizontally across the arrangement and comprising at least one drivable roller and a drive for driving the at least one drivable roller, wherein the at least one drivable roller defining an axis of rotation and having a cylindrical surface, said at least one drivable roller being configured to
    be connected to a vacuum device and comprising at least one vacuum opening for generating a vacuum in a region of the cylindrical surface and which opens into the cylindrical surface of the at least one drivable roller, and
    further comprising a pivot device for pivoting the at least one drivable roller about a pivot axis disposed perpendicular to the axis of rotation of the at least one drivable roller.

2. The arrangement according to claim 1, wherein the at least one drivable roller having the at least one vacuum opening is implemented for exerting a retaining force on the horizontally conveyed material.

3. The arrangement according to claim 1, wherein the at least one drivable roller comprises an axle having an inner cavity and an annular roller body rotatably supported about the axle and implementing the cylindrical surface.

4. The arrangement according to claim 3, wherein the axle comprises at least one pass-through opening leading from the inner cavity outward to the annular roller body, and the at least one pass-through opening, together with the at least one vacuum opening, forming a continuous passage relative to the axle in a defined range of rotary orientation of the annular roller body.

5. The arrangement according to claim 4, wherein the pass-through opening can be oriented toward a conveying space for conveyed materials.

6. The arrangement according to claim 4, wherein the annular roller body comprises a plurality of vacuum openings disposed adjacent to each other and spaced apart from each other parallel to the axis of rotation of the annular roller body.

7. The arrangement according to claim 4, wherein the pass-through opening has a greater extent than the vacuum opening at the outer surface of the axle as seen along the direction of rotation of the annular roller body, thus defining a range of rotary orientation in which the pass-through opening and the vacuum opening form a continuous passage.

8. The arrangement according to claim 3, wherein the annular roller body comprises a plurality of vacuum openings disposed one after another and spaced apart from each other along a direction of rotation of the annular roller body.

9. The arrangement according to claim 3, wherein the at least on drivable roller or the annular roller body is enlaced at least partially by a flexible force transfer element for producing a force-transmitting frictional contact to a conveyed material supported on the at least one drivable roller.

10. The arrangement according to claim 9, wherein the force transfer element is implemented as a drive belt and the at least one drivable roller is driven by the drive belt at least partially enlacing the at least one drivable roller.

11. The arrangement according to claim 1, further comprising a flat support structure implementing a support surface for the conveyed materials, wherein the support structure comprises at least one recess in which the at least one drivable roller is inset such that a segment of the cylindrical surface of said at least one drivable roller protrudes past the support surface.

12. The arrangement according to claim 1, wherein the arrangement comprises at least one roller module having said at least one drivable roller.

13. The arrangement according to claim 12, wherein a plurality of rollers of a roller module are driven by a common drive.

14. The arrangement according to claim 12, wherein the roller module can be pivoted by the pivot device.

15. The arrangement according to claim 1, wherein a plurality of rollers are pivoted via a common pivot device.

16. A conveyor system comprising a conveyor device for horizontally conveying conveyed materials and comprising an arrangement according to claim 1 for steering the horizontally conveyed materials.

17. The arrangement according to claim 1, wherein the arrangement is a conveyor gate in a conveyor system for horizontally conveying conveyed materials.

18. The arrangement according to claim 1, wherein the arrangement is a positioning device for changing the position of conveyed materials in the conveying space of the conveyor device.

19. The arrangement according to claim 1, wherein the arrangement is a feeding device for feeding conveyed materials to the conveyor device of the conveyor system.

20. The arrangement according to claim 1, wherein the arrangement is a dispensing device for dispensing conveyed materials from the conveyor device of the conveyor system.

21. A method for steering horizontally conveyed materials via an arrangement according to claim 1, wherein a vacuum is generated in the region of the at least one vacuum opening at the cylindrical surface of the at least one drivable roller for exerting a retaining and entraining force on a conveyed material supported on the at least one drivable roller, such that the conveyed material is steered out of the previous conveying direction thereof by pivoting the at least one drivable roller about the pivot axis thereof.

* * * * *